(12) United States Patent
Hermoni et al.

(10) Patent No.: US 11,095,533 B1
(45) Date of Patent: Aug. 17, 2021

(54) SYSTEM, METHOD, AND COMPUTER PROGRAM FOR IMPLEMENTING A MARKETPLACE FOR EDGE COMPUTING

(71) Applicant: Amdocs Development Limited, Limassol (CY)

(72) Inventors: Ofer Hermoni, Tenafly, NJ (US); Nimrod Sandlerman, Ramat Gan (IL); Eyal Felstaine, Herzliya (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 39 days.

(21) Appl. No.: 16/280,286

(22) Filed: Feb. 20, 2019

Related U.S. Application Data

(60) Provisional application No. 62/660,142, filed on Apr. 19, 2018, provisional application No. 62/648,287, filed on Mar. 26, 2018, provisional application No. 62/642,524, filed on Mar. 13, 2018, provisional application No. 62/639,910, filed on Mar. 7, 2018, provisional application No. 62/639,923, filed on Mar. 7, 2018, provisional application No. 62/639,913, filed
(Continued)

(51) Int. Cl.
| | |
|---|---|
| *H04L 12/24* | (2006.01) |
| *G06Q 30/02* | (2012.01) |
| *H04L 29/08* | (2006.01) |
| *H04L 12/26* | (2006.01) |

(52) U.S. Cl.
CPC ..... *H04L 41/5051* (2013.01); *G06Q 30/0201* (2013.01); *H04L 41/145* (2013.01); *H04L 41/16* (2013.01); *H04L 43/04* (2013.01); *H04L 67/10* (2013.01)

(58) Field of Classification Search
CPC ....... H04L 41/145; H04L 41/16; H04L 43/04; H04L 67/10; G06Q 30/0201
See application file for complete search history.

(56) References Cited

U.S. PATENT DOCUMENTS

| | | | |
|---|---|---|---|
| 2010/0015926 A1* | 1/2010 | Luff | H04L 41/0686 |
| | | | 455/67.13 |
| 2016/0330097 A1* | 11/2016 | Kim | H04L 43/0864 |

(Continued)

OTHER PUBLICATIONS

Hermoni et al., U.S. Appl. No. 16/280,245, filed Feb. 20, 2019.
(Continued)

*Primary Examiner* — El Hadji M Sall
(74) *Attorney, Agent, or Firm* — Zilka-Kotab, P.C.

(57) ABSTRACT

A system, method, and computer program product are provided for implementing a marketplace for edge computing. In use, a service request is received, at a network communication operator, from a first entity, the service request comprising an edge computing operator of an edge computing service, wherein the first entity is one of a request originator, a customer using a software service, a software service operator providing the software service, or a cloud computing operator providing a computing service to the software service. Additionally, the service request is distributed to at least one second entity, using the network communication operator, wherein the at least one second entity includes at least one of a first request mediator or a second request mediator. Further, the service request is distributed, using the network communication operator, to the edge computing operator.

16 Claims, 17 Drawing Sheets

Related U.S. Application Data on Mar. 7, 2018, provisional application No. 62/648,281, filed on Mar. 26, 2018.

(56) References Cited

U.S. PATENT DOCUMENTS

| | | | |
|---|---|---|---|
| 2016/0358098 A1* | 12/2016 | Duesterwald | G06N 20/20 |
| 2017/0034643 A1* | 2/2017 | Young | H04W 4/70 |
| 2017/0063708 A1* | 3/2017 | Hsu | H04L 67/10 |

OTHER PUBLICATIONS

Hermoni et al., U.S. Appl. No. 16/280,259, filed Feb. 20, 2019.
Hermoni et al., U.S. Appl. No. 16/280,265, filed Feb. 20, 2019.
Hermoni et al., U.S. Appl. No. 16/280,272, filed Feb. 20, 2019.
Hermoni et al., U.S. Appl. No. 16/280,279, filed Feb. 20, 2019.
Hermoni et al., U.S. Appl. No. 16/280,301, filed Feb. 20, 2019.
Hermoni et al., U.S. Appl. No. 16/280,310, filed Feb. 20, 2019.
Hermoni et al., U.S. Appl. No. 16/280,312, filed Feb. 20, 2019.
Hermoni et al., U.S. Appl. No. 16/280,320, filed Feb. 20, 2019.
Hermoni et al., U.S. Appl. No. 16/280,353, filed Feb. 20, 2019.
Hermoni et al., U.S. Appl. No. 16/280,367, filed Feb. 20, 2019.
Hermoni et al., U.S. Appl. No. 16/280,246, filed Feb. 20, 2019.
Hermoni et al., U.S. Appl. No. 16/280,260, filed Feb. 20, 2019.
Hermoni et al., U.S. Appl. No. 16/280,386, filed Feb. 20, 2019.
Hermoni et al., U.S. Appl. No. 16/280,634, filed Feb. 20, 2019.
Hermoni et al., U.S. Appl. No. 16/280,513, filed Feb. 20, 2019.

* cited by examiner

SYSTEM, METHOD, AND COMPUTER PROGRAM FOR IMPLEMENTING A MARKETPLACE FOR EDGE COMPUTING

RELATED APPLICATIONS

The present application claims priority to: U.S. Provisional Application No. 62/639,910, entitled "SYSTEM, METHOD, AND COMPUTER PROGRAM FOR IMPLEMENTING PRUNING RULES IN AN ARTIFICIAL INTELLIGENCE (AI) BASED NETWORK MANAGEMENT SYSTEM," filed on Mar. 7, 2018; U.S. Provisional Application No. 62/639,913, entitled "SYSTEM, METHOD, AND COMPUTER PROGRAM FOR DAMPING A FEEDBACK LOAD-CHANGE IN A COMMUNICATION NETWORK MANAGED BY AN AUTOMATIC NETWORK MANAGEMENT SYSTEM," filed on Mar. 7, 2018; U.S. Provisional Application No. 62/639,923, entitled "SYSTEM, METHOD, AND COMPUTER PROGRAM FOR IMPLEMENTING A MARKETPLACE FOR ARTIFICIAL INTELLIGENCE BASED MANAGED NETWORK SERVICES," filed on Mar. 7, 2018; U.S. Provisional Application No. 62/642,524, entitled "A METHOD AND A SYSTEM FOR MITIGATING AN ATTACK ON A NETWORK BY EFFECTING FALSE ALARMS," filed on Mar. 13, 2018; U.S. Provisional Application No. 62/648,281, entitled "SYSTEM, METHOD, AND COMPUTER PROGRAM FOR AUTOMATICALLY GENERATING TRAINING DATA FOR ANALYZING A NEW CONFIGURATION OF A COMMUNICATION NETWORK," filed on Mar. 26, 2018; U.S. Provisional Application No. 62/648,287, entitled "SYSTEM, METHOD, AND COMPUTER PROGRAM FOR IMPLEMENTING A MARKETPLACE FOR EDGE COMPUTING," filed on Mar. 26, 2018; and U.S. Provisional Application No. 62/660,142, entitled "SYSTEM, METHOD, AND COMPUTER PROGRAM FOR MITIGATING FALSIFIED LOG DATA PROVIDED TO AN AI-LEARNING SYSTEM MANAGING A COMMUNICATION NETWORK," filed on Apr. 19, 2018, the entire contents of each of the listed applications which are incorporated herein by reference.

FIELD OF THE INVENTION

The present invention relates to edge computing, and more particularly to implementing an automatic marketplace for edge computing services.

BACKGROUND

Edge computing can be a complex commercial ecosystem where a customer may use a service from a business entity without having direct business relations with that entity. This is a common situation in telecom services where a subscriber of one network is communicating with a subscriber of another network using an intermediating third network (or more). However, in such situation the characteristics of the service are usually standard.

With edge computing, the service characteristics are not standardized and may vary considerably, not just between customers, providers, applications and various edge computing devices, but also during a specific time. This may create a complex ecosystem with complex marketplace requirements.

As such, there is thus a need for addressing these and/or other issues associated with the prior art.

SUMMARY

A system, method, and computer program product are provided for implementing a marketplace for edge computing. In use, a service request is received, at a network communication operator, from a first entity, the service request intended for an edge computing operator of an edge computing service, wherein the first entity is one of a request originator, a customer using a software service, a software service operator providing the software service, or a cloud computing operator providing a computing service to the software service. Additionally, the service request is distributed to at least one second entity, using the network communication operator, wherein the at least one second entity includes at least one of a first request mediator or a second request mediator. Further, the service request is distributed, using the network communication operator, to the edge computing operator.

DETAILED DESCRIPTION

Figure 1:
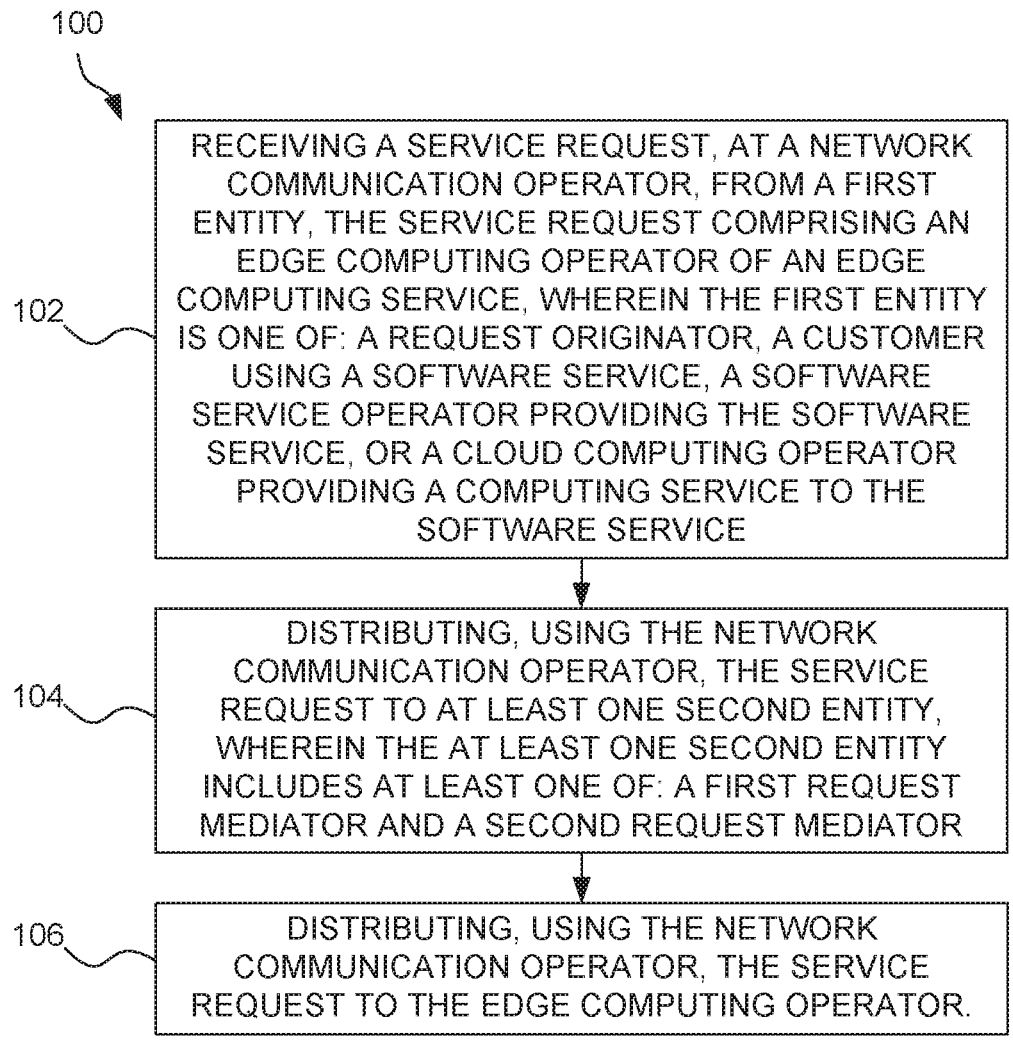
FIG. 1 illustrates a method for implementing a marketplace edge computing service, in accordance with one embodiment.

A modern public digital communication network provides many communication-related services to a very large number of customers where each customer may use a variety of services. Additionally, each service may be used by each customer in a variety of ways. In one embodiment, the business needs of many customers may rapidly change, thereby affecting the manner in which the communication services may be used. As such, business dynamics (and especially increasing business dynamics) may affect the network dynamics, as well as the configuration of the network and the network's services.

One purpose of Network Function Virtualization (NFV) is to implement as many functions of the network as software running over a generic compute server. As such, a virtual (ized) network function (VNF) can be instantiated almost anywhere on the network, based on a network/cluster of generic computers. This ability to instantiate VNFs allows network functions to be migrated throughout the network, which in turn, may lead to network reconfiguration. Additionally, fast migration and network reconfiguration may provide cost savings in both capital spending (CAPEX) and operational spending (OPEX).

In the context of the present description, the term "cost" may refer to any type of expenditure (such as associated with increased capital expenditure (CAPEX), and/or increased operational expenditure (OPEX)), as well as decreased revenues or a limitation on revenue increase. In one embodiment, OPEX may include, for example, a cost of electricity to power any network entity and/or dissipate heat resulting from the operation of any network entity. Additionally, OPEX may also include payment to any third party for using any type of hardware and/or software, including processing power, storage, transmission, etc.

Further, in the context of the present description, the term service configuration" may refer to a network configuration applicable for a particular service. Such particular service may be requested by, and/or proposed to, a particular customer (herein referred to as "requesting party"), for a specific time period, locality, and/or business structure. As such, a service configuration may apply to an entire basis or subset of a communication network(s).

For example, instead of planning a network to a combined worst case (such as a highest expected cumulative demand), CAPEX can be reduced by more accurately planning the network according to an optimized, time-dependent configuration. Thereafter, OPEX can be reduced in periods of low demand by migrating the operating VNFs to one or more central locations and shutting down unused data centers. This cost saving may be one the driving forces behind NFV. Therefore, fast and effective reconfiguration of the network may be a key element in the evolution of NFV and the telecom market.

In addition, the ability to reconfigure the network quickly (and cost effectively) may enable network operators to introduce new services faster, reduce time-to-market, and reduce onboarding costs. Fast and automatic reconfiguration also enable customers to place a demand for a service (e.g., a service level agreement or SLA) shortly before actual use, and request the service for a limited time. Together, fast and automatic reconfiguration may reduce the time and cost of doing business between network operators, operators of software service(s), and/or customers (such as consumers).

The network may be expected to adapt to a constant flow of service demands by continuously optimizing and reconfiguring the network. An optimized network (configuration) may include a network that runs close to its current maximum capacity while providing all required services (based on service level agreements (SLAs) or a similar form of service requirements definition). As the actual (real-time) demand changes, the network configuration may be changed, both by adding or removing infrastructure (e.g., turning hardware on or off), and by migrating and instantiating, or removing VNFs.

The network management system should be able to predict situations requiring network reconfiguration early enough to enable the network to compute the optimized new configuration and effect (orchestrate) it before the actual need arises. Due to the network complexity and the speed of change of demands, the use of artificial intelligence (AI) may be required to meet such a technical demand.

As such, the network management system may generally relate to telecommunications and/or data communications, and, more particularly to the management of a telecommunication network and/or a data network, and, more particularly to network management using artificial intelligence (AI).

FIG. 1 illustrates a method 100 for implementing a marketplace edge computing service, in accordance with one embodiment. As shown, a service request is received, at a network communication operator, from a first entity, the service request comprising an edge computing operator of an edge computing service, wherein the first entity is one of: a request originator, a customer using a software service, a software service operator providing the software service, or a cloud computing operator providing a computing service to the software service. See operation 102. In one embodiment, the service request may comprise at least one of an installation of a software component, an instantiation of the software component, a configuration of the software component, or a configuration of the edge computing service for the software component.

In another embodiment, the service request may comprise at least one of an authentication of the request originator, an authentication of a billing chain, or an authentication of a software component associated with at least one of the request originator or the billing chain. In yet another embodiment, the service request may comprise at least one of a decision tree, a declarative rule, or a neural network. In still another embodiment, the service request may comprise training data associated for the service request.

Additionally, the service request may comprise log data of a network event. Further, the service request may be received in response to at least one of an expiration of a current service request, a network event that prompts a change in a network parameter, or a need to add a new network parameter. In another embodiment, the service request may include log data of a network simulation by an AI engine. Still yet, the service request may include a request for at least one proposed network service. Further, the service request may include at least two service agreements.

In the context of the present description, a "network" may refer to any type of communication network, including analog and/or digital communication networks, wired and/or wireless communication networks, WAN, LAN, PAN, etc. In the context of the present description, a "network" may also refer to hardware and/or software.

In the context of the present description, a "network configuration" may refer to any type of arrangement, configuration, and/or topology of a network or interconnected computing devices (such as may be found in cloud computing), network nodes, and/or servers. In the context of the present description, a "network configuration" may also refer to any type of arrangement, deployment, installation, and/or instantiation of any type of software processed and/or executed by any computational entity in the network.

Further, the network configuration may also include a configuration of any type of communication service, which may include one or more network hardware elements as well as one or more software packages installed and operative in one or more hardware elements of the network.

In another embodiment, a service request may be communicated to a marketplace in various forms such as a list of the characteristics, parameters, priorities and/or weighting factors (e.g. as a comma delimited list or a similar format). Such list may be communicated in the form of a self-descriptive language such as XML or JSON.

In the context of the present description, "log data," "training data," and/or "testing data" may refer to any type of data collected and prepared to train and/or test an artificial intelligence (AI) engine, including an AI-based network design and/or management system (such as in one embodiment where a system is used to prepare a service proposal). Additionally, the log data, training data, and/or testing data may also include a file, repository, and/or a database of data collected during operation of a network, a network slice, and/or a network service, representing events detected and resulting from such operation. In one embodiment, the log data, training data, testing data, etc., may be communicated between parties in various forms such as a file, a database, or a repository, as well as a link or an application programming interface (API) for such file, database, or repository. In one embodiment, the communicated data is provided in a computer readable format such as XML, JSON, or any other useful format.

In one embodiment, the log data may be used to train an artificial intelligence (AI) engine. Additionally, the log data may provide one or more possible network configurations. Further, the log data may be used to evaluate compliance with the service request. In one embodiment, the at least two service agreements may operate in parallel.

In the context of the present description, a "network service," may include a "required network service" and/or "proposed network service" and may refer to any combination of network or communication services, facilities, resources, as well as their parameters such as bandwidth, latency, and/or jitter. Additionally, a network service may also include any type of computing services, facilities, resources, as well as their parameters such as processing power, memory, and/or storage. In one embodiment, each of the at least one proposed network service may include a weighting factor.

Additionally, the service request is distributed, using the network communication operator, to at least one second entity, wherein the at least one second entity includes at least one of: a first request mediator or a second request mediator. See operation 104. In one embodiment, distributing the service request to the at least one second may occur automatically. Further, the service request is distributed, using the network communication operator, to the edge computing operator. See operation 106.

In the context of the present description, a "request mediator" may include any entity that may receive a service request and which may communicate the service request to a second entity. Additionally, an edge computing operator may include any entity or service operating away and/or apart from a central computing node. For example, the edge computing operator may operator one or more edge computing sites, and/or may include a dedicated edge computing operator, a telecom operator operating edge-computing sites, a virtual network operator, a virtual cloud-edge operator, and/or a private entity selling excessive computing power, etc. In one embodiment, the edge computing site may be connected to at least one communication network.

Figure 2A:
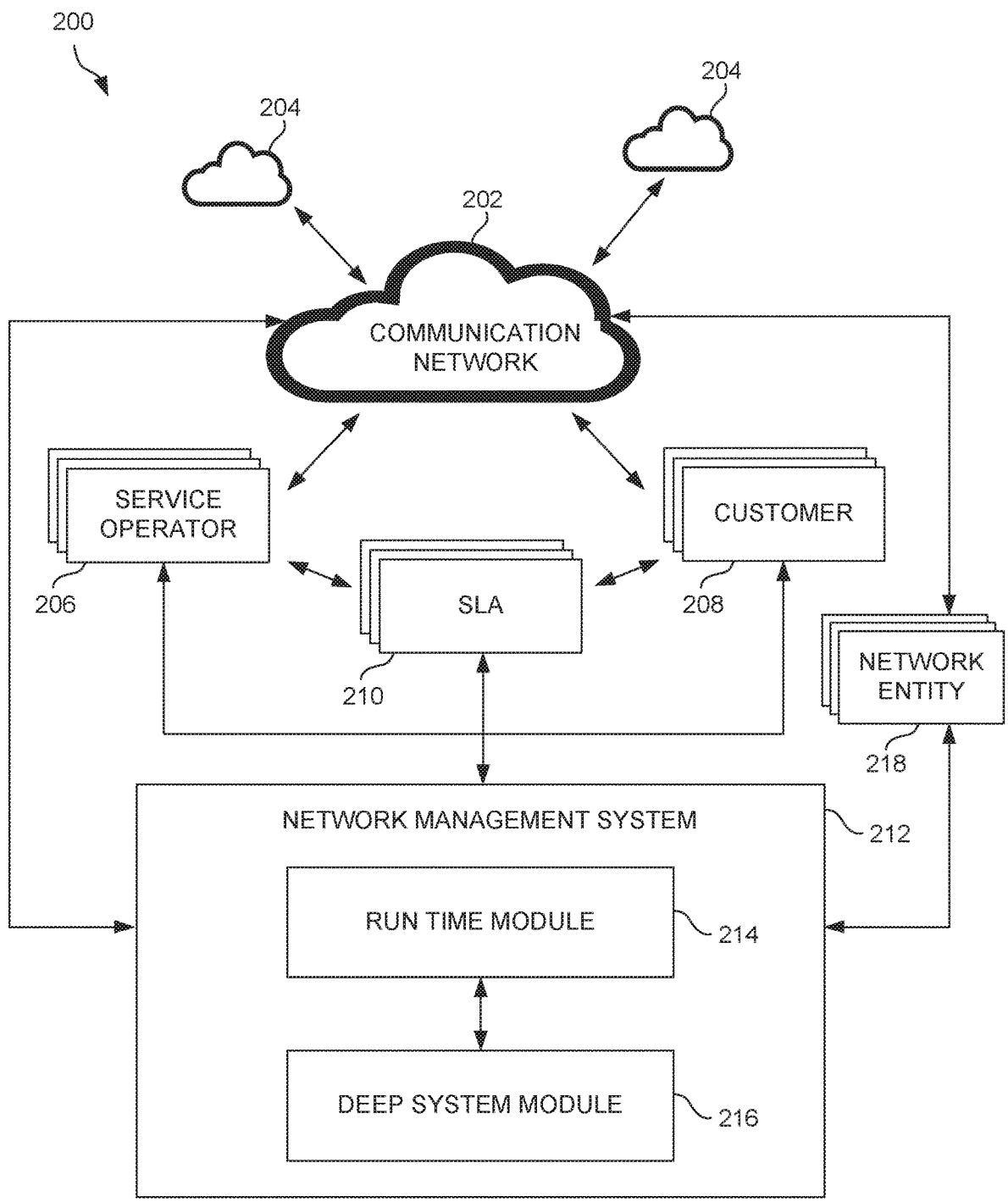
FIG. 2A illustrates a communication network and network management system, in accordance with one embodiment.

FIG. 2A illustrates a communication network and network management system 200, in accordance with one embodiment. As an option, the network management system 200 may be implemented in the context of any one or more of the embodiments set forth in any previous and/or subsequent figure(s) and/or description thereof. Of course, however, the network management system 200 may be implemented in the context of any desired environment. Further, the aforementioned definitions may equally apply to the description below.

In one embodiment, the communication network and network management system 200 may relate to managing a communication network using artificial intelligence (AI).

As shown, the network management system 200 includes a communication network 202, one or more secondary networks 204, a network management system 212 including a run-time module 214 and a deep system module 216. In one embodiment, the one or more secondary networks 204 may be communicatively coupled to the communication network 202.

Communication network 202, and/or any of the one or more secondary networks 204 may be associated with one or more service operators 206 (such as operators of third-party services such as software as a service (SaaS)), customers (such as communication customers 208 and/or consumers using the services of communication network 202 or any of the software services of service operators 206). In one embodiment, a customer of the communication network 202 may be a service operator (such as service operators 206) or a service consumer (such as the communication customers 208). Both the service operator or the service consumer may use services of the communication network 202, as well as services provided by a service provider. Further, the communication network 202 may be connected directly to the network management system 212, and/or may be connected to one or more network entities 218.

In one embodiment, the service operators 206 and/or the communication customers 208 may have an arrangement and/or agreement with an operator of communication network 202, such as one or more service level agreements (SLAs) 210, which may define various parameters of the service(s) provided by communication network 202.

In the context of the present description, the term "communication network", and/or simply "network", may refer to any type of network, including analog and/or digital communication networks, wired and/or wireless communication networks, wide area network (WAN), local area network (LAN), personal area network (PAN), etc., as well as combinations thereof. For example, network may refer to a public service telephony network (PSTN), a public service data network (PSDN), a public land mobile network (PLMN), cellular network, and/or cable network, as well as any other network type and any combination thereof. Further, the term network may include communication hardware, communication software and/or both.

A network may also refer to a sub-network, any type of a part of a network, or a combination of networks, and/or sub-networks, any of which may be overlying and/or overlapping one or more networks and/or subnetworks (such as a virtual network, and/or a network slice, etc.).

In one embodiment, a network may be operated by a network operator, a virtual network operator (VNO), a mobile virtual network operator (MVNO), a business enterprise operating one or more communication services, a business enterprise subscribing to one or more communication networks, one or more virtual communication networks, and/or one or more communication services, etc.

In the context of the present description, the term "network entity" may refer to any type of communication hardware, communication software, and/or communication service including instances of any particular software and/or service. For example, network entity may refer to software executed by a network entity (such as a network node or server), an operating-system (OS), a hypervisor software, a virtual machine, a container, a virtual network function (VNF), a micro-service, etc.

Further, in the context of the present description, the term "network configuration" may refer to any type of arrangement, configuration, topology, etc., of a network, interconnected computing devices (such as cloud computing), network nodes, servers, network entities, etc. In one embodiment, the network configuration may relate to a part (or slice) of a network, or a sub-network. Additionally, network configuration may also refer to any type of arrangement, deployment, installation, instantiation, etc. of any type of software processed and/or executed by any computational entity in the network.

In one embodiment, network configuration may refer to a configuration of any part of a network, or a combination of network, including network slicing, self-organizing networks (SON), edge computing, etc. Network configuration may also include configuration of any type of "communication service", which may include one or more network hardware elements as well as one or more software packages installed and operative in one or more hardware elements of the network.

In the context of the present description, "network service" may refer to any combination of network or communication services, facilities, or resources, as well as associated parameters such as bandwidth, latency, jitter, etc. For example, a network service may include any type of computing services, facilities, resources, as well as their parameters such as processing power, memory, storage, etc. Further, in one embodiment, network service may include a communication service, such as required network service, proposed network service, and/or communication service requirements (such as requirements specified in the SLAs 210).

Figure 2B:
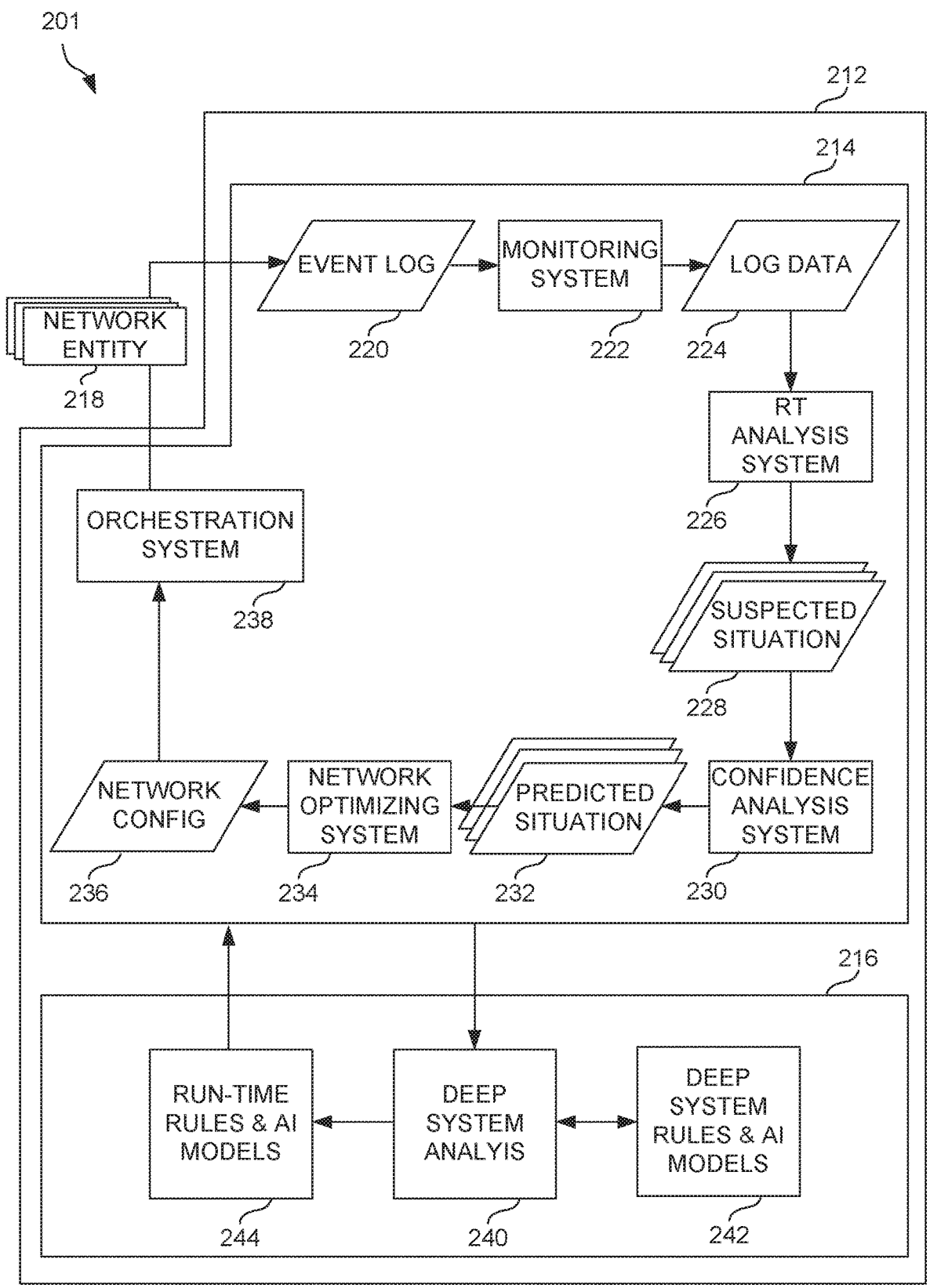
FIG. 2B illustrates a network management system, in accordance with one embodiment.

FIG. 2B illustrates a network management system 201, in accordance with one embodiment. As an option, the network management system 201 may be implemented in the context of any one or more of the embodiments set forth in any previous and/or subsequent figure(s) and/or description thereof. Of course, however, the network management system 201 may be implemented in the context of any desired environment. Further, the aforementioned definitions may equally apply to the description below.

In one embodiment, communication network 202 may include one or more network entities 218 that provide communication services of the communication network 202. For example, the network entities 218 may be arranged in a particular configuration optimized to deliver the communication services (of the communication network 202) according to the one or more SLAs 210. The network management system 212 may determine, implement and manage such optimized configuration of the network entities 218. Additionally, configuration of the network entities 218 may be associated with the deep system module 216, and in particular, the run-time module 214 through use of run time rules and/or AI-models 244, while the deep system module 216 may create, adapt and modify the run-time rules and/or AI-models 244, as well as deep system rules and/or AI models 242 by which the deep system module 216 operates.

In addition, the network management system 212 may include the run-time module 214, which may include an event log, 220, a monitoring system 222, log data 224, a real-time (RT) analysis system 226, one or more suspected situations 228, a confidence analysis system 230, one or more predicted situations 232, a network optimization system 234, network configuration 236, and an orchestration system 238. In one embodiment, the network entities 218, the monitoring system 222, the RT analysis system 226, the confidence analysis system 230, the network optimization system 234, and the orchestration system 238 may function as system components. Similarly, the event log 220, the log data 224, the one or more suspected situations 228, the one or more predicted situations 232, and the network configuration 236 may function as data elements.

The one or more network entities 218 may compute and communicate to the monitoring system 222 the event log 220, typically including values for parameters relating to the performance of the communication network 202 and/or the one or more network entities 218. The monitoring system 222 may then collect the event log 220 (including data records) to create the log data 224. RT-analysis system 226 may then analyze the log data 224 to detect the one or more suspected situations 228. Confidence analysis system 230 may then collect, compare and analyze the one or more suspected situations 228 to determine one or more predicted situations 232. Based on the current predicted situation of the one or more predicted situations 232 the network optimization system 234 may create an optimal network configuration 236. Next, the orchestration system 238 implements the optimal network configuration 236 by reconfiguring the one or more network entities 218.

In one embodiment, deep system module 216 may supervise the operation of the run-time module 214. For example, the run-time module 214 may operate on the basis of run-time rules and/or AI-models 244, which in turn are created and/or managed by the deep system analysis system 240 which operates on the basis of deep-system rules and AI models 242. The deep system analysis system 240 may be a collection of systems, arranged for example in stratified levels with their respective deep-system rules and AI models 242, as explained hereinbelow.

Further, the run-time rules and AI models 244 as well as the deep-system rules and AI models 242, may be created manually, or automatically using respective AI-learning systems operating in the deep system module 216. For example, the deep system module 216 may include any AI learning and/or RT-analysis system (including, for example, AI learning system 510 hereinbelow described). Further, the run time rules and AI models 244 as well as the deep system rules and AI models 242, may be updated, modified and/or adapted manually, or automatically using respective AI-analysis (serving) systems operating in the deep system module 216.

In one embodiment, an entity operating a network may use the network management system 212 and/or the orchestration system to manage one or more network configurations. Additionally, in the context of the present description, the term "configuration change" and/or "reconfiguration" may refer to any type of change in network configuration. In one embodiment, the type of change may include a load-change, network fault, preventive maintenance, cyber-attack, etc. Additionally, a network optimizing system (such as network optimizing system 234) and/or orchestration system (such as orchestration system 238) may analyze load conditions, requirements, and/or changes to determine if a configuration change is necessary, and if so, determine optimal configuration settings, including generating and/or applying a configuration change.

In one embodiment, a configuration change may be analyzed, determined and affected by an AI-based network optimizing system 234 and/or orchestration system 238 using one or more artificial intelligence (AI) engines. Such an AI-engine may use AI rules (e.g., AI-Model(s)), which may be created by an AI-engine using deep learning and/or machine learning technology to analyze training data based on, or sourced from, log data. For example, the AI-based network optimizing system 234 and/or orchestration system 238 may use AI rules (AI-Models) to analyze load-changes, determine a configuration change, and/or effect an appropriate configuration change.

In the context of the present description, the term "load" may refer to any type of network characteristic, parameter, and/or service. For example, load may include bandwidth, latency, jitter, processing power, memory, storage, etc. Additionally, load may include any requirement (such as used by such network characteristic, parameter, and/or service). Additionally, the term "load-change" may refer to any change in load. For example, load-change may include a change of a load requirement, use, and/or consumption, associated with a network characteristic, parameter, and/or service. In one embodiment, load-change may cause a configuration change. As such, load-change may include other causes for a configuration change, such as a network fault, anticipated network fault (such as requiring preventive maintenance), cyber-attack and/or security breach, etc. Further, load-change may include a change in load (such as a load decrease) that may be used in turn to shut down equipment and reduce operating costs or may include an anticipated load-change which may be used to anticipate the development of a particular load-change.

Additionally, in the context of the present description, the term "log data" may refer to any record (including a file, repository, and/or database) which may represent an event detected in the network. Such an event may be detected by one or more network nodes or servers, by software executed by such network nodes or servers, by a network management system or software (including, but not limited to, a network orchestration system or software), and/or by a network-monitoring system. Additionally, the log data may include identification of an event (such as a network event), associated data characterizing the particular event, and/or identification of the current network configuration or topology. As such, log data may include event-log data as well. In one embodiment, log data may include a link to a file, repository, and/or database, or may be included within an application programming interface (API) for such file, repository, and/or database. If log data is communicated, it may be communicated in a computer readable format such as XML.

Further, log data may be used to train and/or test an AI-engine (including an AI-based network design and/or management system).

In the context of the present description, the term "characterization" may refer to defining any type(s) of network or communication services, facilities, resources, etc. For example, characterization may include defining a network service that is required, including associated computing services, facilities, resources, etc. In one embodiment, characterization may include the term "characteristic".

Moreover, in the context of the present description, the term "current network configuration" and/or "current network topology" may refer to a network configuration and/or topology in use at the time of logging an event and/or at the time of executing a rule. Additionally, the term "configuration representation" may refer to a mechanism that can represent a network configuration. For example, configuration representation may include software (e.g., VNF) deployment, service definitions, respective allocation of network and processing resources (e.g., bandwidth, latency, jitter, etc., processing power, memory, storage, etc.). A configuration representation may enable re-creation of a particular network configuration and/or topology, may enable simulation or emulation of the operation of a particular network configuration and/or topology, and/or may enable identification of a re-occurrence of a particular network configuration and/or topology.

Further, in the context of the present description, the term "network situation" may refer to a condition of the communication network (such as communication network 202) that may require a configuration change, or network reconfiguration. The network situation may be an unwanted situation (such as a failure), or a wanted situation (such as an opportunity to reduce cost, for example, by turning off a network entity). The network situation may be determined for the communication network (or any part of the communication network), for a service (or any part of the service), and/or for a network entity (such as one or more network entities 218), etc.

For example, the network situation may be determined for a particular SLA (such as one of the one or more SLAs 210). A network situation associated with an SLA may represent a situation where the network (or an associated service) does not perform according to the SLA. As such, the characteristics of the network situation may be any collection of parameters representing a fault or an opportunity (e.g., to reduce cost), etc. Such cause for the network situation may be associated with a load, or a load change.

Additionally, the network situation may be associated with a network fault (such as a hardware fault and/or a software fault), anticipated network fault (such as requiring preventive maintenance), cyber-attack, and/or security breach, etc.

In one embodiment, the network management system (such as network management system 212) may be used to detect a developing network situation before it adversely affects the network behavior, or to exploit an opportunity to save cost.

In this respect, in the context of the present description, the term "death expectancy" may refer to a period of time remaining for a particular predicted network situation until it adversely affects a particular service and/or SLA.

In one embodiment, the term or "minimal reconfiguration time", may refer to the minimal period required to reconfigure the network to avoid a respective failure, or to exploit a respective opportunity. For example, to resolve a predicted situation before it adversely affects the particular service and/or SLA. Therefore, the minimal reconfiguration time should be smaller than the death expectancy.

In one embodiment, resolving a particular predicted situation may be delayed until the death expectancy approaches the respective minimal reconfiguration time. Additionally, death expectancy may also refer to a period of time remaining to exploit a particular predicted situation.

Further, the term "life expectancy" may refer to a period of time where the particular network configuration may remain useful before the utility diminishes (and it may then be in need of being replaced with a different network configuration).

Figure 2C:
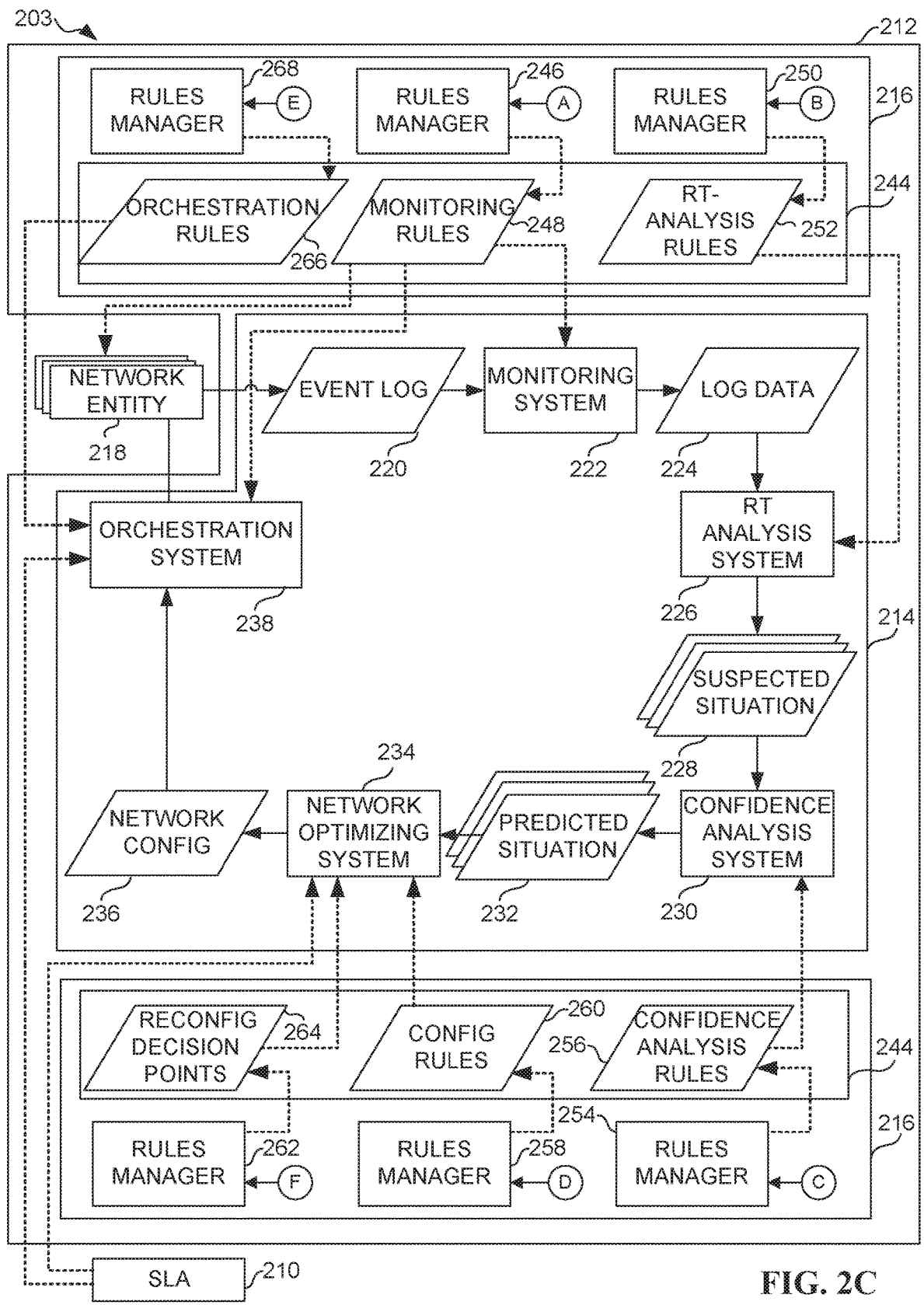
FIG. 2C illustrates a network management system, in accordance with one embodiment.

FIG. 2C illustrates a network management system 203, in accordance with one embodiment. As an option, the network management system 203 may be implemented in the context of any one or more of the embodiments set forth in any previous and/or subsequent figure(s) and/or description thereof. Of course, however, the network management system 203 may be implemented in the context of any desired environment. Further, the aforementioned definitions may equally apply to the description below.

As shown, the network management system 203 includes the network management system 212 which includes run-time module 214 and run-time rules and/or AI-models 244 of deep system module 216.

Run-time rules and/or AI-models 244 may be in communication with various components of the run time module 214, such as: monitoring rules 248 (in communication with monitoring system 222), real time (RT)-analysis rules 252 (in communication with RT analysis system 226) which may be used to analyze the log data 224 and/or to detect the one or more suspected situations 228, confidence analysis rules 256 (in communication with confidence analysis system 230) to analyze the one or more suspected situations 228 and determine the one or more predicted situations 232, configuration rules 260 (in communication with the network optimization system 234 and/or the reconfiguration decision points 264) to analyze the one or more predicted situations 232 and create network configurations 236, reconfiguration decision points 264 (in communication with configuration rules 260 and network optimizing system 234), and orchestration rules 266 (in communication with orchestration system 238) to implement the network configuration 236.

The run-time module 214 may also receive data including from SLAs 210. Of course, any of the monitoring rules 248, RT-analysis rules 252, confidence analysis rules 256, configuration rules 260, reconfiguration decision points 264, and/or orchestration rules 266 may be in communication with any specific element of run-time module 214.

Configuration rules 260 may be used by the Network Configuration 236 to create an optimal network configuration according to a network infrastructure, a current state of the network, available predictions of near-future network behavior, SLAs (or similar requirement definitions), cost considerations, available resources, etc. In one embodiment, cost considerations may include the cost of installing, updating and/or synchronizing a new network entity and/or a new virtual network function, moving data from one new network entity (and/or virtual network function) to another network entity (and/or virtual network function), and/or the cost of specific resource in a specific location, etc.

Reconfiguration decision points 264 may include network situation(s) where a new network configuration may be computed and determined. For example, a reconfiguration decision point may be determined according to a predicted situation, or a combination of predicted situations. Additionally, the network optimizing system may determine a point in time when a new network configuration may be required by applying rules associated with the reconfiguration decision points 264 (which may relate to the predicted situations 232). Additionally, a predicted situation data may contain sufficient information (such that an action can be implemented via the network optimizing system 234) about a near future predicted behavior of particular network entities. Further, the network optimizing system 234 may receive current values and corresponding near-future predictions of value changes for any and all parameters of all the network entities 218.

In the context of the present description, a reconfiguration decision point includes a situation where a new network configuration may be computed and determined. In one embodiment, a reconfiguration point may be determined according to a predicted situation, or a combination of predicted situations.

It is appreciated that each collection of rules such as monitoring rules 248, RT-analysis rules 252, confidence analysis rules 256, configuration rules 260, reconfiguration decision points 264, and orchestration rules 266, may be implemented in the form of a file, a repository, or a database. Additionally, such implementation may include a same entity (e.g., file, repository, etc.) for all rules, or may include a different entity (e.g., file, repository, etc.) for each collection of rules.

Additionally, each collection of rules may apply to one or more systems. For example, monitoring rules 248 may apply to network entities 218, monitoring system 222, and/or orchestration system 238. Monitoring rules 248 may direct each of the network entities 218 how and when to report an event log 220, including specifying parameters and/or values to report, etc. Further, monitoring rules 248 may direct monitoring system 222 how to arrange the log data 224.

Further, each collection of rules may be managed by one or more systems. For example, monitoring rules 248 may be created and/or modified by one or more administrators as well as by monitoring system 222, orchestration system 238, and/or confidence analysis system 230. Therefore each collection of rules may be managed by a rules manager, which may receive inputs via a respective hook and determine the respective rule change. In particular, monitoring rules 248 may receive input from rules manager 246, RT-analysis rules 252 may receive input from rules manager 250, confidence analysis rules 256 may receive input from rules manager 254, configuration rules 260 may receive input from rules manager 258, reconfiguration decision points 264 may receive input from rules manager 262, and/or orchestration rules 266 may receive input from rules manager 268.

In one embodiment, each collection of rules may be formed to enable simple addition, removal, selection, and/or deselection (pruning) of rules. Additionally, a system providing an input to any collection of rules (such as monitoring rules 248, RT-analysis rules 252, confidence analysis rules 256, configuration rules 260, reconfiguration decision points 264, and/or orchestration rules 266) may create a new rule, remove a rule, select/deselect (prune) a rule, and/or modify parameters of a rule.

A rules manager (such as any, some, or all of rules manager 246, 250, 254, 258, 262, and/or 268) may eliminate and/or reduce repetitive, too frequent, and/or possibly conflicting rule changes by implementing hysteresis and/or a dead-time period, a majority vote, weights and priorities, etc. For example, a system creating a rule may have priority and/or preference over any other system with respect to a particular rule. Additionally, the system may be particular to the rule managers 246, 250, 254, 258, 262 and/or 268 to prevent an over-ruling event where a first system runs-over a second (or another) system.

In the context of the present description, the term "parametrization" may refer to defining one or more values, or range(s) of values, for any characteristic of the required network or communication service, facility, resource, etc. In one embodiment, parametrization may include alternative acceptable values, or value ranges, with alternative respective priorities. The term "prioritization" may refer to defining priorities for, or between, the various required network or communication services, facilities, resources, etc., as well as their respective parameters.

Additionally, in the context of the present description, the term "weighting" may refer to defining and/or associating evaluation weights to characteristics and/or parameters for computing at least one value. In one embodiment, weighting may include a weighting factor. Additionally, the at least one value may be used for evaluating a particular proposed network service with a minimum requirement, and/or comparing between alternative proposals.

Monitoring rules 248 may instruct the one or more network entities 218 which parameters (such as parameters of the event log 220) to measure, when to measure each parameter, how to measure the parameter, and how to report any measurement. Additionally, one or more network entities may derive the rules directly from a database associated with the monitoring rules 248, or receive the rules from the monitoring system 222 periodically, or per a preconfigured schedule. In another embodiment, the monitoring rules 248 may instruct the monitoring system 222 how to measure inter-network entity parameters, including parameters involving, correlating, or synchronized between, more than one network entity of the one or more network entities 218. Further, the monitoring rules 248 may instruct the monitoring system 222 how to create, format, arrange, and/or maintain a log data file (such as log data 224) or a database associated with the log data 224. In this manner, the monitoring rules 248 may be conditional upon network situations, and transform according to such network situations (including a progression of the network situations).

The monitoring rules 248 may additionally guide the orchestration system 238 where to instantiate a monitoring probe. After the monitoring probe is instantiated, the monitoring system 222 may instruct such probe (or a monitoring function, or any other reporting network entity) which parameter (or parameters) to measure and report, a frequency of reporting, and a timing to report, such as when a measured value crosses a particular (or preconfigured) threshold, or characteristics of a particular service follow a particular temporal pattern (such as set time intervals, etc.).

Figure 3:
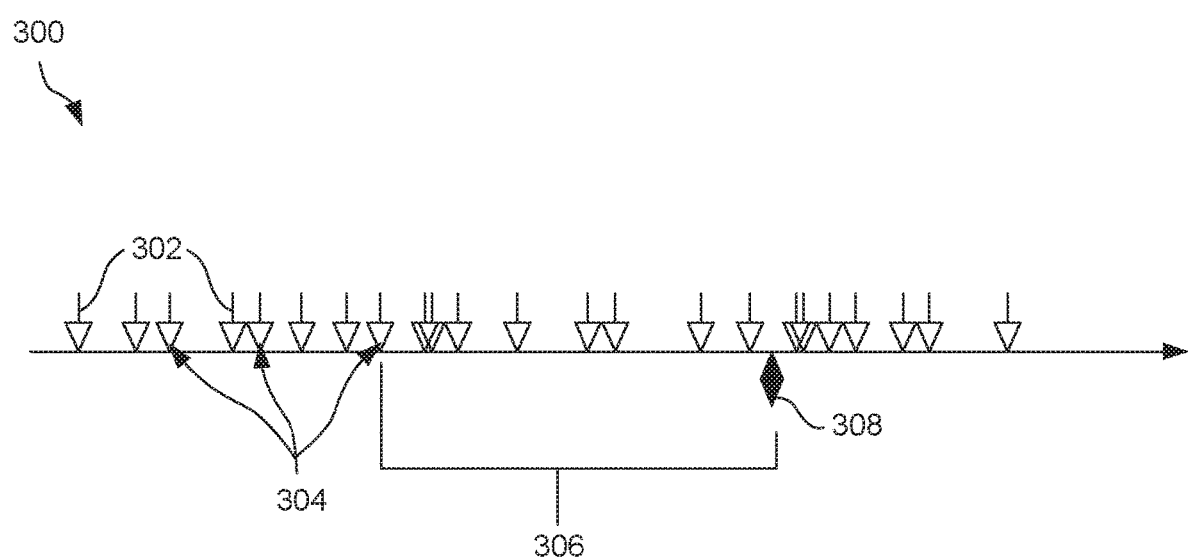
FIG. 3 illustrates an event-log timeline, in accordance with one embodiment.

FIG. 3 illustrates an event-log timeline 300, in accordance with one embodiment. As an option, the event-log timeline 300 may be implemented in the context of any one or more of the embodiments set forth in any previous and/or subsequent figure(s) and/or description thereof. Of course, however, the event-log timeline 300 may be implemented in the context of any desired environment. Further, the aforementioned definitions may equally apply to the description below.

As shown, event-log timeline 300 includes event-log records 302, including log-pattern/classifier 304, and a label for a particular network situation 308.

The log-pattern/classifiers 304 precedes the particular network situation 308 by a time period 306. The time period 306 may be a minimal reconfiguration time. In one embodiment, the time period 306 may be larger or equal to the minimal reconfiguration time. Additionally, the particular pattern of the log-pattern/classifiers 304 may be construed as a classifier for the particular network situation indicated by a label for the particular network situation 308.

Figure 4A:
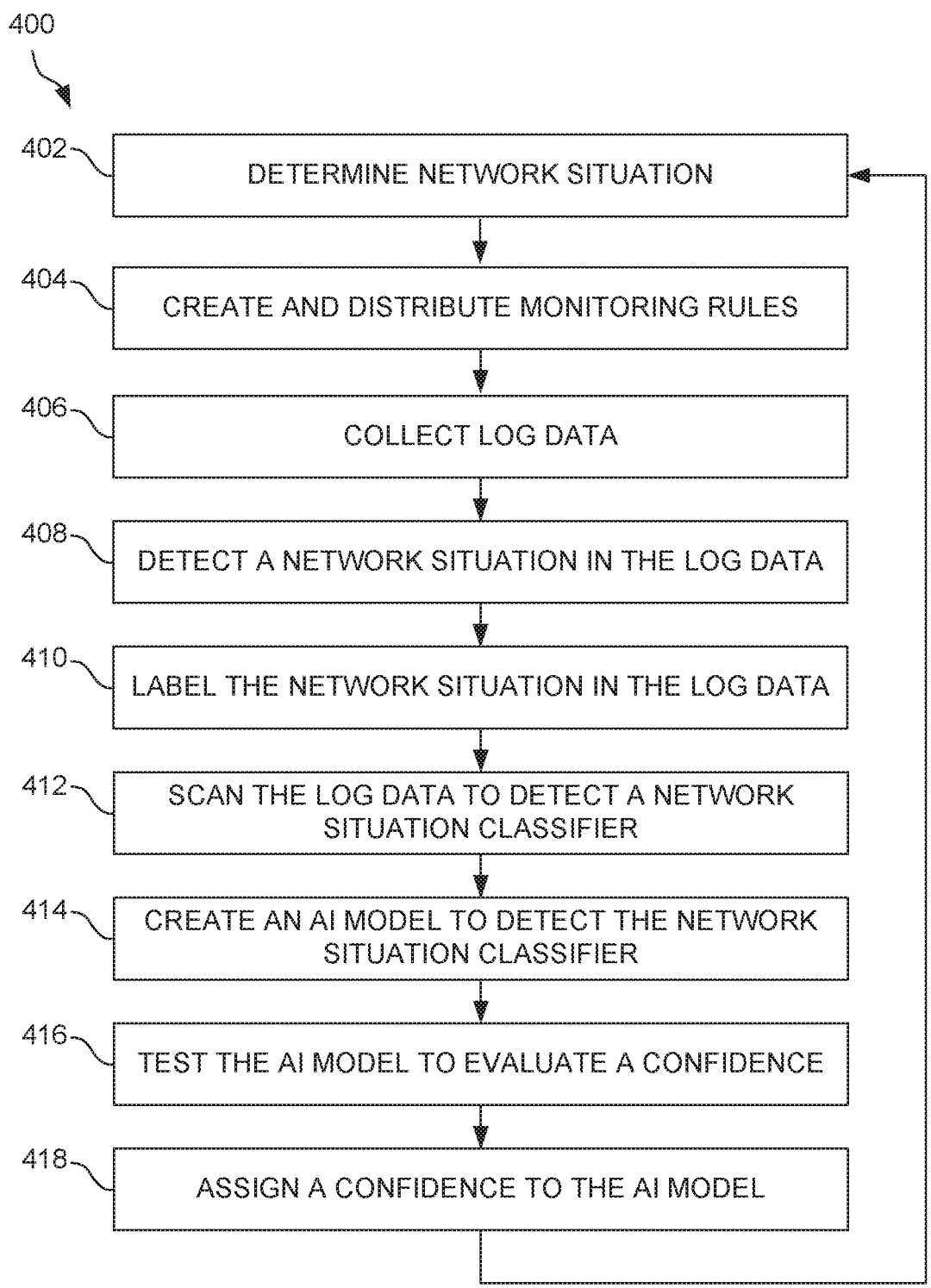
FIG. 4A illustrates a method for processing log data, in accordance with one embodiment.

FIG. 4A illustrates a method 400 for processing log data, in accordance with one embodiment. As an option, the method 400 may be implemented in the context of any one or more of the embodiments set forth in any previous and/or subsequent figure(s) and/or description thereof. Of course, however, the method 400 may be implemented in the context of any desired environment. Further, the aforementioned definitions may equally apply to the description below.

Method 400 shows part of log data (such as the log data 224) processed for creating an AI-model. In one embodiment, the method 400 illustrates a flow chart of a process for creating an AI-model for the RT analysis system 226. As shown, a network situation is determined. See operation 402. In one embodiment, determining the network situation may include also determining particular characteristics of the network situation. For example, a network situation may be an unwanted situation (such as a failure), or a wanted situation (such as an opportunity to reduce cost, for example, by turning off a network entity). A network situation may be determined for a network (or any part of a network), for a service (or any part of a service), for a network entity (such as network entities 218), etc. For example, a network situation associated with an SLA may represent a situation where the network (or an associated service) does not perform according to the SLA. As such, the characteristics of the network situation may be any collection of parameters representing a fault or an opportunity (e.g., to reduce cost), etc. Such cause for the network situation may be associated with a load, or a load change.

At operation 404, monitoring rules may be created and/or distributed. Such monitoring rules may be used to instruct a relevant network entity (of the network entities 218) to measure and report one or more parameters that may be relevant to a network situation(s). Additionally, the monitoring rules may instruct the network entity when to measure each parameter, and how to report any measurement. In one embodiment, a rate of measuring a parameter may be different (such as being more frequent) than a rate of reporting. Further, the reporting may be conditioned by a value measured (or calculated), such as an average value, rate of change of value, etc. Moreover, the monitoring rule may include instructions to locally store unreported measurement(s) for a predetermined span of measurements and/or time.

In another embodiment, a monitoring rule may instruct one or more network entities 218 and/or the monitoring system 222 to report values of parameters and/or characteristics for a particular service in a particular temporal pattern. For example, the event log 220 the or log data 224, may report a timely value of a parameter, or the time in which the value of a parameter crossed a predetermined threshold value, etc.

At operation 406, event-log records are collected, including, log data which may be relevant to the network situation as determined by the characteristics of the network situation.

Additionally, a network situation in the log data is detected in the log data. See operation 408. In one embodiment, the network situation may be detected based on characteristics of the network situation. At operation 410, the network situation in the log data is labeled. Further information relating to the log data and/or the event-log data may be found in FIG. 4.

At operation 412, the log data (such as log data 224) is scanned to detect a network situation classifier. In one embodiment, the log data may include training files used to determine a particular pattern of particular event-log records. Additionally, one or more training files may be created based on such log data. In one embodiment, the network situation classifier may include a particular sequence of parameter value(s) carried by log data (such as log data 224). Additionally, it may precede and/or predict, a network situation. Further, the particular sequence of parameter value(s) may be specific to a configuration of network entities (such as network entities 218) and services, as well as to the set of monitoring rules (such as monitoring rules 248) executed at that period.

At operation 414, an AI model is created to detect the networks situation classifier. For example, in one embodiment, one or more RT-analysis rules 252 (e.g., a rule-base) may be created for detecting the particular networks situation classifier. In the context of the present description, this rule-base, when created by an AI learning system (such as the RT analysis system 226), may be considered an "AI-model". It is to be appreciated that this network situation classifier and the respective AI-model (i.e., rule-base) may be particular to the network configuration for which the log data (such as log data 224) is collected. In one embodiment, the one or more RT-analysis rules 252 may be implemented as AI models created by an AI learning system (such as RT-analysis rules 252 that may be used by the RT analysis system 226 to detect a classifier in the log data 224).

Additionally, in the context of the present description, the term "particular rule-base" may refer to a rule-base derived from a data-set associated with a particular network configuration and/or topology, or a particular spectrum of network configurations and/or topologies. Further, a particular rule-base, especially in the context of an AI-learning system, may be equivalent to the term "AI-Model". AI-Model may therefore include any collection of rules generated by an AI-learning system, including a deep-learning system and/or a similar entity. The AI-Model may include data relating to a neural-network.

Further, the AI model may be tested to evaluate a confidence level. See operation 416. For example, the AI model may be tested using testing files, including testing files created from log data (such as the log data 224). The AI-model may be tested for a particular network situation classifier. Additionally, a measure of the confidence level may be calculated relating to the detection of a particular network situation classifier (such as an event-log pattern) by the particular AI-model. It is to be appreciated that this networks situation classifier and the respective AI-model may be particular to a specific network configuration for which the log data is collected.

In the context of the present description, the term "confidence level" may refer to any measure of confidence of detecting a classifier, and/or an event-log pattern, that may be associated with a particular suspected situation and/or predicted situation. For example, the confidence level may be measured/calculated according to a percentage of false-positive and/or false-negative detection of the particular classifier, and/or an event-log pattern. The measure of confidence level may represent a probability that, based on a particular suspected situation and/or predicted situation being detected, the particular suspected situation and/or predicted situation will develop. Further, confidence level may be represented simply by "confidence" particularly when associated with a confidence analysis such as a confidence analysis system and/or confidence analysis rules.

At operation 418, a confidence may be assigned to the AI model. For example, the AI-model may be outputted with a specific confidence level to a database associated with the RT-analysis rules 252. In one embodiment, the database may include RT-Analysis Rules 252 and thus may be accessed by the RT analysis system 226. Further, the database may be linked to the RT analysis system 226 and may contain the RT-Analysis Rules 252. After assigning a confidence to the AI model, method 400 may be repeated (starting back at operation 402) for any number of network situations, and/or to amend the confidence of the AI model based on an updated network situation.

In one embodiment, the RT-analysis rules 252 for a particular predicted situation may include a rules-base (such as an AI model) for detecting a sequence of event-log data (such as log data 224) preceding the predicted situation, and/or for reporting current values and corresponding near-future predictions of parameter value(s) changes in relation to any and/or all of the network entities 218 involved.

Figure 4B:
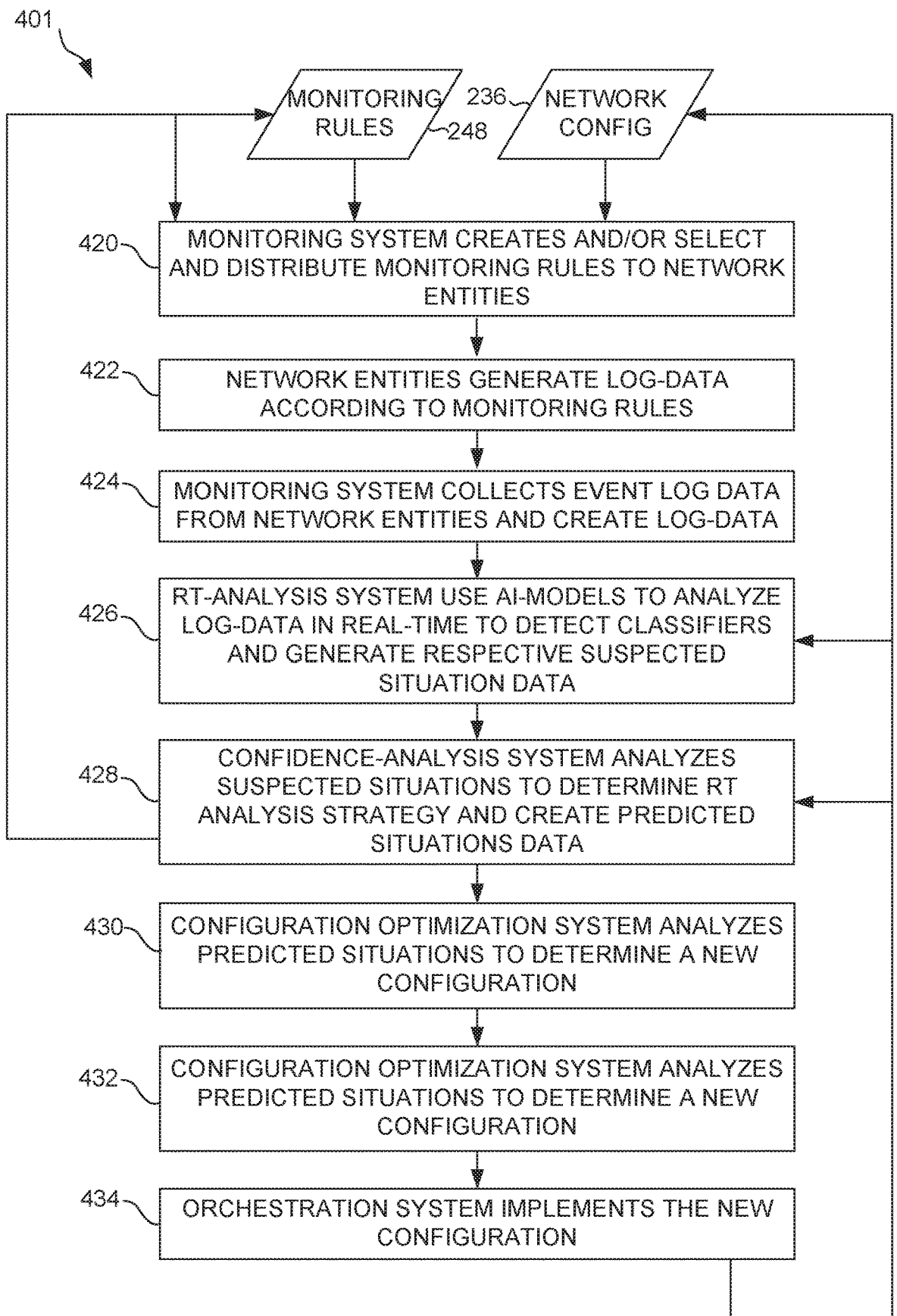
FIG. 4B illustrates a method of a run time process using an AI-model, in accordance with one embodiment.

FIG. 4B illustrates a method 401 of a run time process using an AI-model, in accordance with one embodiment. As an option, the method 401 may be implemented in the context of any one or more of the embodiments set forth in any previous and/or subsequent figure(s) and/or description thereof. Of course, however, the method 401 may be implemented in the context of any desired environment. Further, the aforementioned definitions may equally apply to the description below.

In one embodiment, the method 401 may show a run-time process which may be used by the run-time module 214. In one embodiment, the run-time module 214 may use the method 401 using an AI-model as may be created by the method 400. Additionally, in another embodiment, the method 401 may be executed continuously as a main loop (without a start or end point). Further, the steps of the method 401 may be executed in parallel, or simultaneously, by various systems (such as but not limited to the monitoring system 222, the RT analysis system 226, the confidence analysis system 230, the network optimizing system 234, the orchestration system 238) of the network management system 212.

As shown at operation 420, the monitoring system 222 may create and/or select and distribute the monitoring rules 248 to the network entities 218. In one embodiment, the monitoring rules 248 may be distributed based on a current network configuration. The monitoring system 222 may receive the current network configuration from the orchestration system 238. Further, the monitoring system 222 may continue to create and/or select and distribute the monitoring rules 248 to the network entities 218 as needed.

At operation 422, the network entities 218, using the monitoring rules 248, may generate and send the event log 220 to the monitoring system 222. The network entities 218 may generate and send the event log 220 continuously as needed.

At operation 424, the monitoring system 222 may collect the event log 220 from the network entities 218 and may create the log data 224 (which may be run-time log data). The monitoring system 222 may continue to create the log data 224 continuously.

At operation 426, the RT-Analysis system 226 may use the AI-Models of the RT-Analysis Rules 252 to analyze the log data 224 in real-time to detect the log-pattern/classifiers 304 and generate the respective data for the suspected one or more suspected situations 228. Operation 426 may also be executed continuously, as RT-Analysis system 226 may receive from the monitoring system 222 new log data 224, detect more log-pattern/classifiers 304, and generate more data for the one or more suspected situations 228. Each of the one or more suspected situations 228 may be associated with a respective confidence level, which may indicate a probability of occurrence of the respective network situation within a particular time period (such as the time period 306).

Additionally, at operation 428, the confidence analysis system 230 may analyze the suspected situations 228 and their respective confidence levels to determine and adapt the RT appropriate analysis strategy. For example, the confidence analysis system 230 may request the monitoring system 222 to create and/or select and distribute the monitoring rules 248 to the network entities 218 to increase the probability of detecting a log-pattern/classifiers 304, and/or to increase the confidence level of a respective suspected situation 228. In one embodiment, the confidence analysis system 230 may generate respective data of the predicted situations 232, such as where a respective confidence level reaches a predetermined threshold. The confidence analysis system 230 may process operation 428 continuously and/or repeatedly as the suspected situation 228 may be further received from the RT-Analysis system 226.

At operation 430, the network optimization system 234 may analyze the predicted situations 232 to determine a new network configuration 236. The network optimization system 234 may process the RT-Analysis system 226 continuously and/or repeatedly as the predicted situations 232 may be further received from the confidence analysis system 230.

Further, at operation 432, the orchestration system 238 may receive from the network optimization system 234 a new network configuration 236 and implement it (at operation 434) by modifying, migrating, installing and/or removing the network entities 218. The orchestration system 238 may process operation 432 continuously and/or repeatedly as the network configuration 236 is further received from the network optimization system 234. As a new network configuration is implemented, the monitoring system 222 may create and/or select and distribute the monitoring rules 248 to the respective network entities 218, and the RT analysis system 226 may select and/or use the respective AI-models included in the RT-Analysis Rules 252.

Additionally, the network optimizing system 234 may determine the network configuration 236 that the orchestration system 238 may then implement to avoid or exploit one or more of the predicted situations 232. Implementing a new network configuration 236 may result in a configuration change or a network reconfiguration. The network optimizing system 234 may determine which of the pending predicted situations 232 should be treated (e.g., avoided or exploited) in the subsequent configuration change.

In one embodiment, the network optimizing system 234 may determine a new network configuration 236 while the orchestration system 238 may still be implementing another (e.g., previously instructed) configuration change (of a previously implement network configuration 236). For example, the network optimizing system 234 may instruct parallel configuration changes affecting different parts of the communication network 202 and/or different network entities 218, and/or different services.

As such, the network optimizing system 234 may consider several parameters that may affect a decision associated with a reconfiguration of the network. Such parameters may include cost, priority, severity, confidence level, death expectancy of the pending predicted situation, life expectancy of a new configuration, collision with another reconfiguration currently processed by the orchestration system 238, etc. In the context of the present description, the term "minimal reconfiguration time" may refer to a minimal time required by an orchestration system (such as orchestration system 238) to migrate one or more network entities (such as network entities 218). In one embodiment, minimal reconfiguration time may be associated with a particular service and/or SLA, and, more particularly but not exclusively, with a particular network situation associated with the service and/or SLA.

In one embodiment, a configuration change (such as implemented via the network optimizing system 234 or the orchestration system 238) may be tagged, identified, and/or associated with one or more particular causes and effects and/or result (such as a particular load-change, requirement, fault, cyber-attack, etc.). For example, the network optimizing system 234 and/or orchestration system 238 may tag and/or associate a configuration change with one or more of the causes for a particular configuration change. Additionally, each tag or association may be assigned a weighting factor representing the effect of a particular cause on determining the particular configuration change.

Further, configuration settings may be stored as a data record or a data field in a file or a database (such as a database associated with network optimizing system 234). The data field or data record may include a start and stop time of the respective configuration, and the format of the data field or data record may enable a software package to identify the differences between two (or more) configurations represented by their respective data field or data record.

In the context of the present description, the term "difference measure" may refer to a value representing a difference between two (or more) configurations. Additionally, the term "dislocation" may refer to an entity located in a configuration which differs from the location noted in a reference configuration. A dislocation may refer to a missing entity, an added entity, and/or an entity located in a different place. Such entity may be any hardware component and/or a software component, such as a VNF instance, and/or a service, such as a micro-service.

In various embodiments, training and/or testing data may be derived from the same data-set (including log data). Additionally, the training data may be used to train the AI-engine to produce a rule-base, and the testing data may be used to evaluate the effectiveness of the developed rule-base.

The network optimization system 234 may determine the network configuration 236 which the orchestration system 238 may then implement to avoid or exploit one or more predicted situations. In one particular situation, implementing a new network configuration may result in a configuration change or a network reconfiguration. As such, the network optimization system 234 may determine which of the pending predicted situations should be treated (e.g., avoided or exploited) during the next configuration change.

Additionally, the network optimization system 234 may determine a new network configuration while orchestration system 238 may still be implementing another (e.g., previously instructed) network configuration 236. For example, network optimization system 234 may instruct parallel configuration changes affecting different parts of communication network 202, network entities 218, and/or different services.

In one embodiment, the network optimization system 234 may consider a variety of parameters which may affect a reconfiguration decision, including but not limited to, cost, priority, severity, confidence level, death expectancy of the pending predicted situation, life expectancy of the new configuration, collision with another reconfiguration currently processed by the orchestration system 238, etc. These parameters may also be considered in the context of processing the reconfiguration decision points 264 by the network optimizing system 234.

Additionally, it is to be appreciated that a configuration or reconfiguration change may directly affect cost. For example, a configuration change may involve migration of a software entity from one hardware entity to another. Such a migration may be executed in the form of "make before break", so as not to disrupt or adversely affect any service. This operation may mean that software entity B is installed, operated and updated in hardware entity B before software entity A is removed from hardware entity A. Therefore, software entity A and software entity B may be operative in parallel, and may each be implemented on a specific hardware entity, thereby increasing cost, including hardware, electricity, maintenance (including dissipating heat from hardware) costs, as well as third party costs including processing, storage, communication, licensing, etc.

Furthermore, any additional costs (including extra hardware entities, etc.) may obviously affect the ability to generate income using the particular hardware entity.

Additionally, a configuration or reconfiguration change may be subject to priorities (such as due to limited resources). For example, migrating a first software entity from hardware entity A to hardware entity B may adversely affect the ability to migrate a second software entity to hardware entity A or to hardware entity B, as well as to any other hardware entity depending on a communication facility and/or hardware entity involved in the migration of the first software entity.

In one embodiment, the network optimization system 234 may use at least two sets of rules including configuration rules (which may determine how to resolve one or more predicted situations by an optimal reconfiguration) and reconfiguration decision points 264 (which may additionally determine when to resolve pending predicted situations).

In one embodiment, based on the processing of the reconfiguration decision points 264, the network optimization system 234 may determine which of the pending predicted situations to process for the next network configuration and when to process such pending predicted situations. For example, the network optimization system 234 may determine based on a reconfiguration condition point (of the reconfiguration decision points 264), whether to effect a reconfiguration immediately, or to delay a reconfiguration based on, for example, a combination of long death expectancy and low confidence level. In one embodiment, a reconfiguration may be delayed until a confidence level increases.

Additionally, the deep system module 216 may include processes (e.g., modules, systems) that may create and modify run-time rules. In one embodiment, the deep system module 216 may be construed as a -reverse analysis channel as it may use the output of the run-time module 214 to manage run-time rules. In other words, the deep system module 216 analyzes the behavior of the run-time module 214 so as to improve it by optimizing the rules controlling the behavior of the run-time module 214, such as adaptive pattern recovery and/or behavioral patterns.

Figure 5:
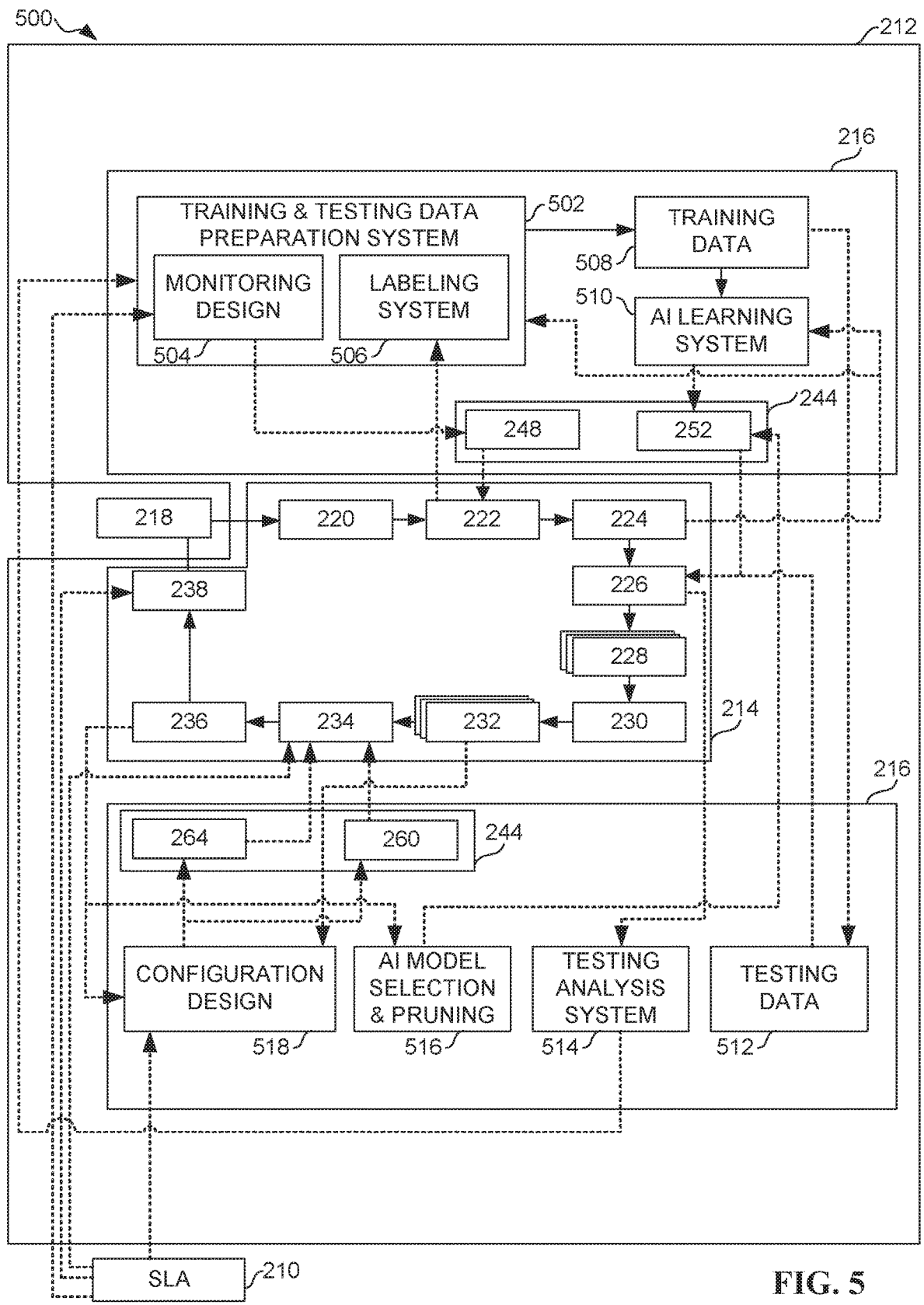
FIG. 5 illustrates a network management system, in accordance with one embodiment.

FIG. 5 illustrates a network management system 500, in accordance with one embodiment. As an option, the network management system 500 may be implemented in the context of any one or more of the embodiments set forth in any previous and/or subsequent figure(s) and/or description thereof. Of course, however, the network management system 500 may be implemented in the context of any desired environment. Further, the aforementioned definitions may equally apply to the description below.

As shown, an AI learning system 510 which may produce the RT-analysis rules 252 (or the AI-models, or predictors). The AI learning system 510 may analyze training data and/or testing data that is created from the log data 224 to produce RT-analysis rules 252. Additionally, the AI learning system 510 may receive as input the log data 224.

Additionally, the training and testing data preparation system 502 may include a monitoring design module 504 and a labeling system 506. Labeling system 506 may convert log data (such as the log data 224) into training-data and testing-data for the AI learning system 510. The labeling system 506 may label training-data and testing-data. In one embodiment, the labeling system 506 may determine where to properly mark network situations in the training-data and/or testing-data. In one embodiment, the labeling system 506 may receive as input the log data 224 from the monitoring system 222. In one embodiment, the log data inputted to the labeling system 506 may be separate from the log data 224. For example, in one embodiment, the monitoring system 222 may provide separate log data to the labeling system 506. The output of the labeling system 506 includes training data and testing data (based on log data with labels of network situations). The output of the monitoring design module 504 includes monitoring rules adapted to particular network situations.

In one embodiment, the monitoring design module 504 may create and distribute monitoring rules to one or more relevant network entities such that that network situations and their respective classifiers can be detected. Additionally, a network situation may depend on a network configuration and/or the monitoring rules (such as the monitoring rules 248) which may depend on the network situations and/the network configuration.

Additionally, the monitoring design module 504 may optimize monitoring rules to improve the log data collected and provided to the training and testing data preparation system 502 such that predicted situations can be predicted more accurately and/or earlier, and to enable detection of more or new predicted situations. The output of the training and testing data preparation system 502 may be provided as training data 508, which in turn, may be sent to the AI learning system 510.

As shown, the configuration design system 518 may optimize configuration rules (such as configuration rules 260 and/or reconfiguration decision points 264) to improve the results of the network configuration system. To that end, the configuration design system 518 may receive inputs from the run-time module, including the network configuration 236 and/or one or more predicted situations 232, as well other network parameters, including SLAs 210. Additionally, the configuration design system 518 may measure the quality of the computed network configuration, including a cost of a reconfiguration, time required to reconfigure the network, a length of time the configuration has lasted, etc. In one embodiment, the configuration design system 518 may include goals for the network reconfiguration.

Additionally, an AI model selection & pruning 516 system may receive the network configuration 236 and based on such, may select and prune network configurations, resulting in RT-analysis rules 252. Further, testing analysis system 514, may receive an output from the RT analysis system, and may provide such data as input to the training and testing data preparation system 502.

Figure 6:
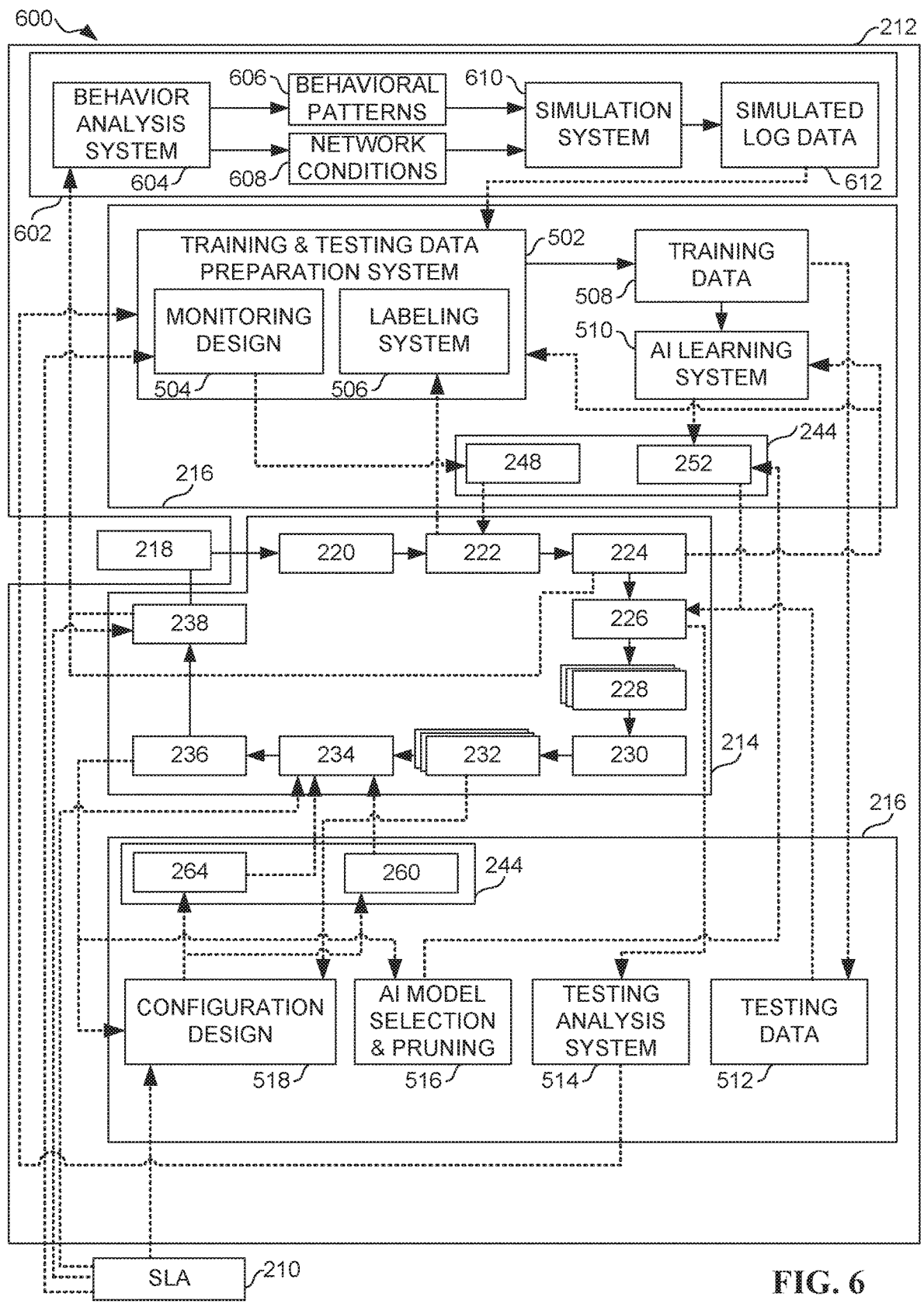
FIG. 6 illustrates a network management system, in accordance with one embodiment.

FIG. 6 illustrates a network management system 600, in accordance with one embodiment. As an option, the network management system 600 may be implemented in the context of any one or more of the embodiments set forth in any previous and/or subsequent figure(s) and/or description thereof. Of course, however, the network management system 600 may be implemented in the context of any desired environment. Further, the aforementioned definitions may equally apply to the description below.

As shown, the network management system 600 builds upon the network management system 500. In one embodiment, the network management system 600 may be used to simulate network behavior when there is no sufficient amount of log data (which may result from network dynamics, including new network configurations). In such a situation, log data may be simulated or synthesized. In particular, simulating log data may include analyze the network behavior to produce primitives that may then be used as components from which training data is composed/synthesized/simulated.

A higher level of the deep system module 216 of the network management system 212 may include processes (e.g., modules, systems) that simulate a network behavior when there is not enough log data (such as the log data 224). Insufficient log data may result from network dynamics. As demand changes and shifts more rapidly and more frequently, particular network configurations may not produce sufficient log data. Additionally, network configurations may be new (thereby having no history of log data). As such, there may be a need to simulate (or synthesize) log data. The simulation level (corresponding with the simulation module 602) may include a collection of mechanisms that analyze the network behavior to produce "primitives". The primitives in turn may be used as a simulation of training-data and testing-data for a new configuration.

In one embodiment, the simulation module 602 may include a behavior analysis system 604, which may produce several primitives, including behavioral patterns 606 and network conditions 608. In one embodiment, the behavioral patterns may include sequences of event-log data (such as log data 224) produced by a network entity (of the network entities 218), or a particular virtual network function (or a similar entity), that are characteristic of a particular arrangement such as a timing to serve a particular service to a particular customer.

At simulation system 610, log data may be simulated or synthesized for a particular configuration, including arranging, interlinking, and interleaving, behavioral patterns. As such, the behavioral patterns 606 should be properly detected, defined, and characterized, such that they can be properly selected and combined in the process of simulating, or synthesizing, log data as shown in simulated log data 612.

Additionally, network conditions 608 include situations that may be predicted by the RT analysis system 226. Additionally, the network conditions 608 may serve as labels for labeling (via the labeling system 506 of the training & testing data preparation system 502) the training data 508 (or testing data) for the AI learning System 510. As such, the network conditions 608 should be properly detected, defined, and characterized, such that they can be automatically detected and properly labeled in old and new simulated (synthesized) log data, as shown in simulated log data 612. For example, a network condition (of the network conditions 608) may be characterized by one or more network parameter(s), and/or by a condition of one or more of particular type(s), including a network fault, a service fault, an SLA fault, a cyber-attack, a security breach, a cost-reduction opportunity, etc.

Figure 7:
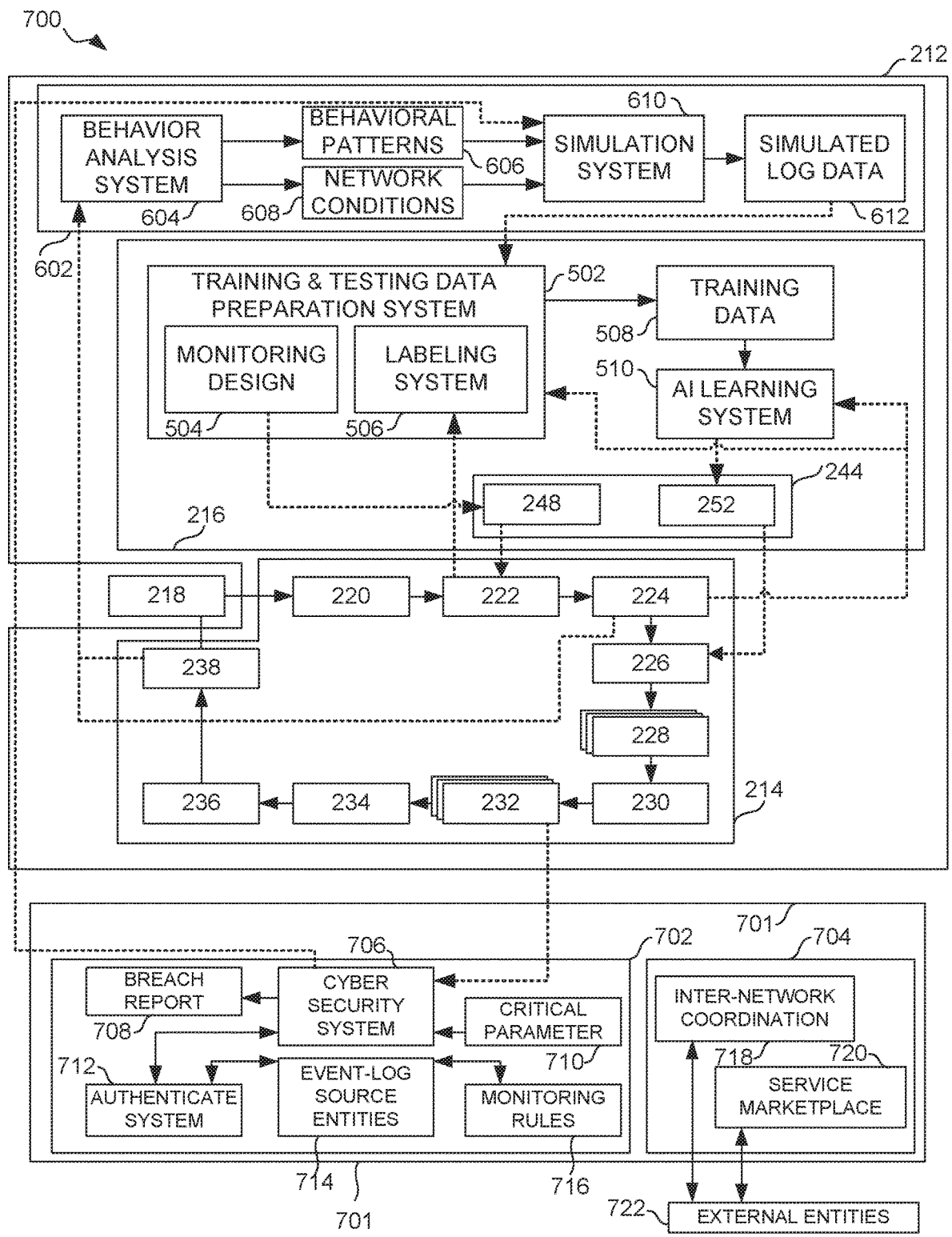
FIG. 7 illustrates a system, in accordance with one embodiment.

FIG. 7 illustrates a system 700, in accordance with one embodiment. As an option, the system 700 may be implemented in the context of any one or more of the embodiments set forth in any previous and/or subsequent figure(s) and/or description thereof. Of course, however, the system 700 may be implemented in the context of any desired environment. Further, the aforementioned definitions may equally apply to the description below.

As shown, a security module 702 and a coordination module 704 may relate to an exogenic level 701. The exogenic level 701 may be separate from the network management system 212, the run-time module 214, and/or the deep system module 216. In one embodiment, the exogenic level 701 may include any aspect foreign to the network management system 212, including but not be limited to interaction with the outside world, other networks, other network management systems, cyber-attacks, and/or any other phenomena that is not intended as internal to the network management system 212.

The system 700 may relate to systems and functions that interact with the environment of the communication network 202. For example, coordination module 704 may include inter-network coordination 718 and service marketplace 720. In one embodiment, inter-network coordination may include coordinating load and configuration matters with neighboring networks, automatically negotiating with other networks and customers, mitigating cyber attacks, etc. Additionally, the inter-network coordination 718 and the service marketplace 720 may communicate with one or more external entities 722. For example, the external entities may include other networks, and/or network systems of customers.

The coordination module 704 therefore may involve computation(s) that depend on the current configuration of the network. In this manner, the coordination module 704 may relate to rules that apply to the current configurations, including current monitoring rules 248, current RT-analysis rules 252, current confidence analysis rules 256, current configuration rules 260, orchestration rules 266, current behavioral patterns 606, etc.

Any such rules of any layer/module/component of the network management system 212 may be exchanged with any external party (such as another network operator, a service provider, and/or a consumer), and/or transmitted to or received from any external party. Additionally, when negotiating network information with a third party (or third parties) any rule may be encrypted and embedded in the negotiation information. In one embodiment, the negotiation information may include the configuration and associated rules that apply to the network condition.

As shown, security module 702 may include a cyber security system 706 which may receive input from critical parameter 710, authenticate system 712, and one or more predicted situations 232. The security module 702 additionally includes an event-log source entities 714 which may be in communication with the monitoring rules 716. In one embodiment, the monitoring rules 716 may include monitoring rules 248. Further, the security module 702 may include a breach report 708 that receives an output from the cyber security system 706. The cyber security system may additionally provide output to the simulation system 610.

In various embodiments, although not shown in FIG. 7, the system 700 may also interact with various components of the network management system 500 and/or the network management system 600. For example, the inter-network coordination may interface with the behavior analysis system 604 and/or the configuration design system 518. In like manner, the service marketplace 720 may interface with the behavior analysis system 604 and/or the configuration design system 518.

Additionally, although the systems which control the network optimizing system 234 are not shown in FIG. 7, it is to be understood that such control systems/aspects are specifically shown in FIG. 5 and/or FIG. 6. Additionally, the training data 508 in FIG. 7 is not shown with an output, as the testing data 512 system is specifically not shown (but which is detailed in relation to FIG. 5 and/or FIG. 6). It is to be appreciated that any omissions of flow of instructions and/or data in FIG. 7 may be supplemented through FIG. 5 and/or FIG. 6. To simplify FIG. 7, aspects of FIG. 5 and/or FIG. 6 were omitted in FIG. 7 to more clearly show the system 700.

Further, data exchanged between systems and/or processes (such as exemplified in FIG. 7 and other figure) may be communicated indirectly, such as by memory, storage, data sharing facility, and/or a database system. A database system may be included within any of the modules, such as any component of the network management system 212. Further, the database system may include network configuration records, network situations associated with their respective network configurations, network situations associated with their respect minimum configuration time values, monitoring rules associated with network situations to which each monitoring rule is applicable, AI-models associated with their respective network situations, confidence levels and/or time periods associated with their respective AI-models and/or network situations, etc.

Figure 8:
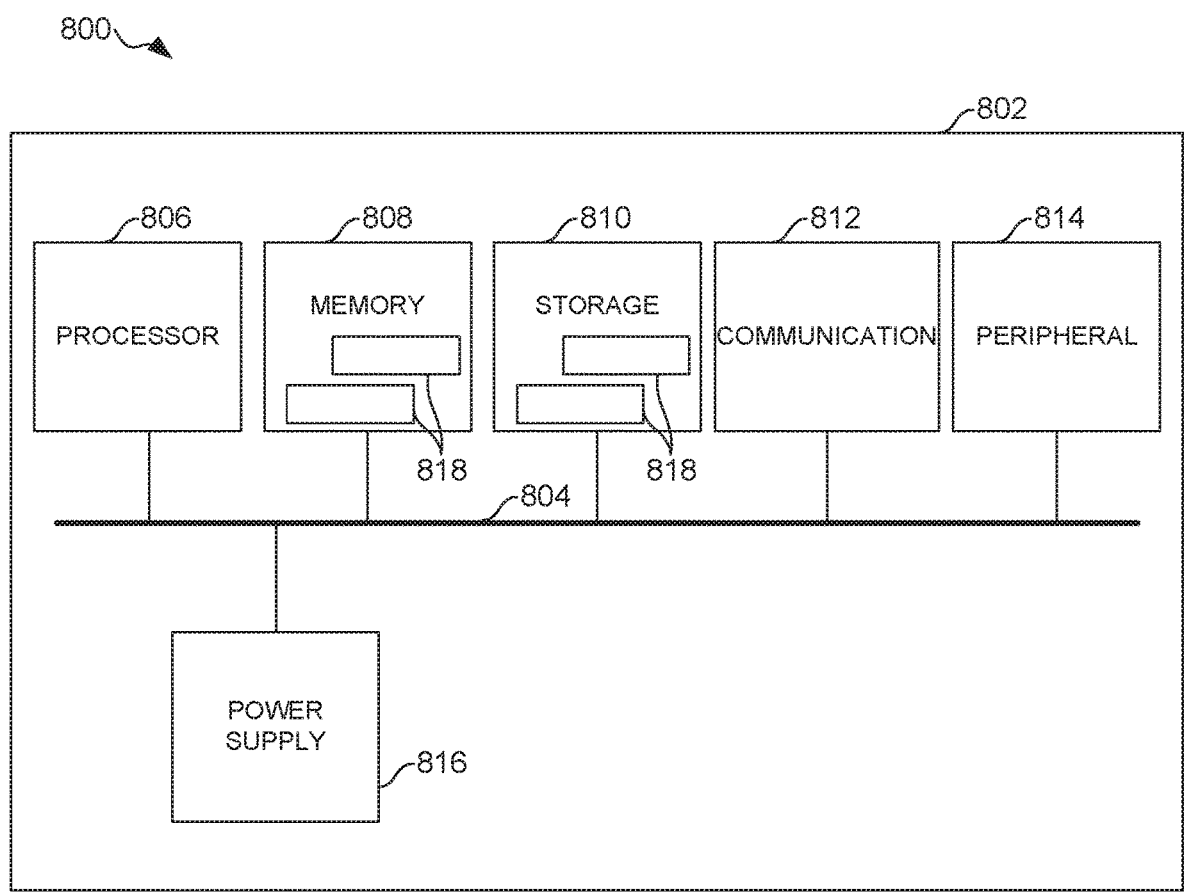
FIG. 8 illustrates a block diagram, in accordance with one embodiment.

FIG. 8 illustrates a block diagram 800, in accordance with one embodiment. As an option, the block diagram 800 may be implemented in the context of any one or more of the embodiments set forth in any previous and/or subsequent figure(s) and/or description thereof. Of course, however, the block diagram 800 may be implemented in the context of any desired environment. Further, the aforementioned definitions may equally apply to the description below.

As shown, block diagram 800 includes a computational device 802 which may be used for a network entity (such as network entities 218) and/or any computing element such as the network management system 212, the deep system module 216, etc., according to one exemplary embodiment. Additionally, the computational device 802 may include at least one processor unit 806, one or more memory units 808 (e.g., random access memory (RAM), a non-volatile memory such as a Flash memory, etc.), one or more storage units 810 (e.g. including a hard disk drive and/or a removable storage drive, representing a floppy disk drive, a magnetic tape drive, a compact disk drive, a flash memory device, etc.), one or more communication units 812, and/or one or more peripheral units 814 (or peripheral control units). The communication unit 812 may use any type of communication technology. Additionally, the computational device 802 may also include one or more communication buses 804 connecting any of the units of the computational device 802.

Further, the computational device 802 may also include one or more power supply units 816 providing power to any of the units of the computational device 802.

The computational device 802 may also include one or more computer programs 818, or computer control logic algorithms, which may be stored in any of the memory units 808 and/or storage units 810. Such computer programs, when executed, may enable the computational device 802 to perform various functions. Additionally, the memory units 808 and/or storage units 810 and/or any other storage may be a tangible computer-readable media.

Figure 9:
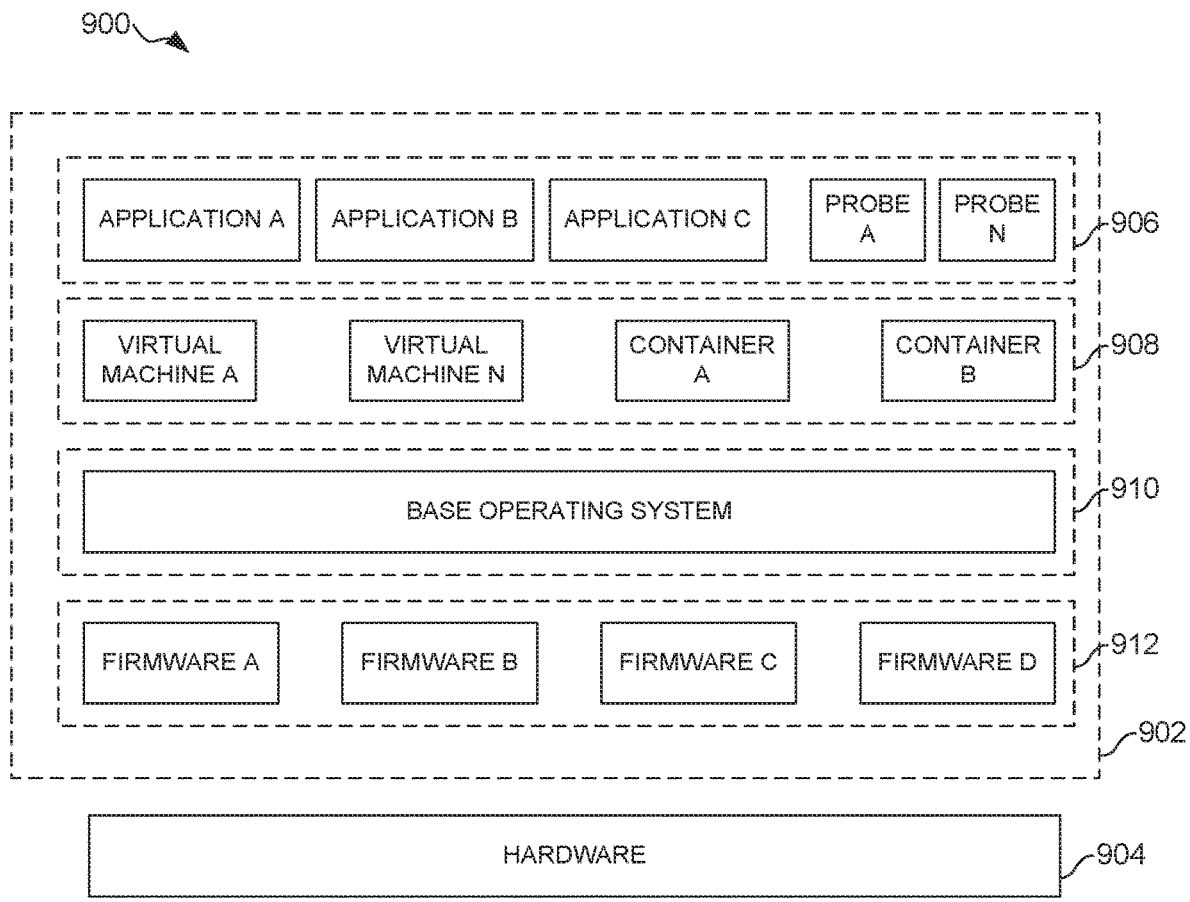
FIG. 9 illustrates a block diagram of software programs, in accordance with one embodiment.

FIG. 9 illustrates a block diagram 900 of a software programs, in accordance with one embodiment. As an option, the block diagram 900 may be implemented in the context of any one or more of the embodiments set forth in any previous and/or subsequent figure(s) and/or description thereof. Of course, however, the block diagram 900 may be implemented in the context of any desired environment. Further, the aforementioned definitions may equally apply to the description below.

In one embodiment, the block diagram 900 may be used by the computational device 802 such as part of the one or more computer programs 818 according to one exemplary embodiment. Additionally, computer programs 818 may operate over hardware 904, which may include hardware components as shown and described with reference to FIG. 8.

The computer programs 902 may include a first level of one or more firmware 912 software programs. The one or more firmware 912 may provide control of one or more hardware components (such as the storage unit 810, communication unit 812, and/or a peripheral unit 814). The computational device 802 may also include a second level of a base operating system 910. The base operating system 910 may provide control of memory units 808 and the hardware 904, typically via firmware 912, as well as communication and coordination between other components.

Additionally, the computer programs 902 may also include a third level 908 of a one or more virtual machines and/or containers. Each virtual machine may include one or more subordinate operating systems, as well as a library of functions. Each container may include subordinate operating systems as well as a library of functions.

The computer programs 902 may also include a fourth level 906 of one or more application software programs and/or probes. An application software program may be any of the software systems as herein described.

In one embodiment, a probe may include a software program that monitors and/or measures (and reports to a monitoring system such as the monitoring system 222) one or more operational parameters of any of the lower levels (such as the third level 908, the base operating system 910, and/or the firmware 912 of a first level), the hardware 904, and/or operating parameters of one or more applications. For example, an application or a probe may be executed over the base operating system 910 directly, over a virtual machine (typically executing a subordinate operating system), or embedded within a container (typically also embedding a subordinate operating system).

In various embodiments, the communication network and network management system of FIG. 2A may orchestrate (and/or manage, control) any component of any level of the computational device 802. Additionally, any component of any level of the computational device 802 may measure one or more operational parameters and report such within the event log 220, typically according to a monitoring rule (such as the monitoring rules 248), to the monitoring system 222. Further, the operations associated with network configuration, configuration change, reconfiguration, and/or migration, may refer to any software component of any level shown of the block diagram 900.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

In this respect, the SLA 210 or any similar descriptions of wanted and/or unwanted network behavior (e.g., cost saving, service fault, cyber-security attack/breech, etc.) may be used to define a corresponding one or more parametrized network situations. A network situation 1022 may be parametrized in the sense that it can be detected when the value of one or more operational parameters of the network reaches a particular threshold, etc.

The monitoring rules 248 may be devised and implemented in sufficient network entities 218 to report the pertinent parameters identifying the respective network situation. The network situation may be detected in the log data 224 of the communication network and properly labeled. The AI-learning system 510 may be used to detect a classifier (such as a log-pattern, or a pattern of event parameters reported by various network entities 218, where the log-pattern predicts a following network situation). In one embodiment, the AI-learning system 510 may operate in two steps where an unsupervised AI learning may search for a classifier and the AI-learning system 510 may then create an AI-model 244 to automatically detect a particular single classifier instance.

In a first step, an unsupervised AI learning may search for a classifier, such as a correlated repetition of patterns in the log data 224 preceding the network situation within a particular time range, wherein the time range may be statistically significant. Additionally, this may include a statistical process where the AI-learning system 510 may investigate a large number of instances of a particular type of network situation (as labeled) to identify a repetitive pattern of the log data 224 (which may be found immediately preceding the network situation within a particular time range), which may be identified as lead-time. It should be noted that there may be any number of different patterns of the log data 224 preceding a network situation type. In this sense, 'immediately' may mean within a predefined time range.

In a second step, the AI-learning system 510 may create an AI-model (such as the run-time rules and/or AI models 244) to automatically detect a particular single classifier instance wherein the classifier (or the associated network situation) may have a confidence level representing the probability that the detected classifier will indeed mature into a network situation within a time range about the lead-time.

It should be further noted that these two steps may be implemented as a single procedure performing these two steps as a combined iterative process of detecting the classifier and creating the AI-model.

In one embodiment, the product of the AI-learning system 510 may be an AI model that detects a particular classifier. Further, the classifier may be a pattern of data elements, and the AI-model is a piece of software (e.g., a neural network) that detects the particular pattern in a stream of log data, so that, although the classifier and the AI-model may be different, they may also be closely related. Thus, parameters associated with the classifier may be associated with the AI-model and vice versa.

In one embodiment, the classifier, and hence the respective AI-model, may include such parameters as the time of the classifier, an identification of a particular type of network situation that may follow the classifier, a lead-time, and possibly a time range, a confidence level, and parameter characterization. In the context of the present description, the term confidence level may refer to the probability that the identified network situation will mature within a predetermined time range. In one embodiment, the predetermined time range may be at the end of the lead-time following the time of the classifier. Other parameters may include parameters associated with a group of classifiers and/or AI-models, such as a resolution stage (level) and minimum reconfiguration time, which may be associated with the network situation, etc.

Although the classifier itself may be unknown, the AI-learning system 510 may provide some data about the classifier, such as the parameters that the AI-model may process to detect an identifier. Additionally, these parameters may form a parameter characterization data and, thus, the parameter characterization data of a particular AI-model may identify each such parameter by type, as well as the particular network entities reporting the particular parameter.

In one embodiment, while the AI-learning system 510 may scan for a lower resolution classifier, the AI-learning system 510 may be requested to look for a classifier with a lead-time longer than any higher resolution classifier. In another embodiment, while the AI-learning system 510 scans for a higher resolution classifier, the learning system may be requested to look for a classifier with higher confidence level than any lower resolution classifier. Therefore, the AI-learning system 510 may produce a multi-stage structure of AI-models with increasing resolution, increasing confidence level, and decreasing lead-time (and vice versa).

Figure 10:
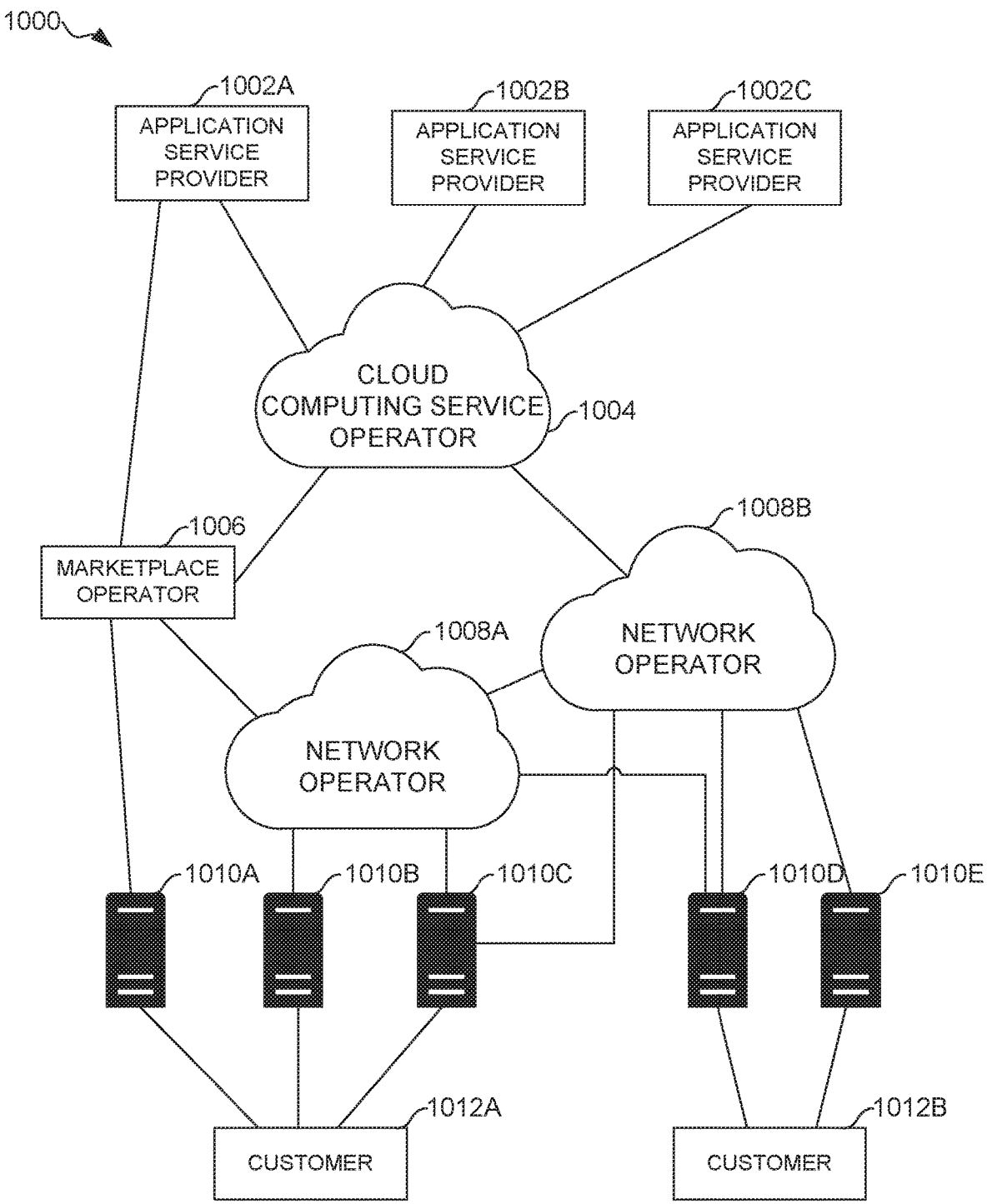
FIG. 10 illustrates a system diagram of an ecosystem for an automatic marketplace for edge computing services, in accordance with one embodiment.

FIG. 10 illustrates a system diagram 1000 of an ecosystem for an automatic marketplace for edge computing services, in accordance with one embodiment. As an option, the diagram 1000 may be implemented in the context of any one or more of the embodiments set forth in any previous and/or subsequent figure(s) and/or description thereof. Of course, however, the diagram 1000 may be implemented in the context of any desired environment. Further, the aforementioned definitions may equally apply to the description below.

It should be noted that, in one embodiment, the automatic marketplace system may be used to enable continuous optimization of the service according to business developments as well as developments in the computer-network infrastructure (both hardware and software). For example, a user at a customer site whose job is to design the service and define the respective requirements may view, online, as the user changes the requirements, proposed service configurations, the respective parameters of various characteristics, and/or respective cost.

In operation, a customer 1012A and 1012B may be an individual, a company (or other business entity), a group, and/or a community. Additionally, the application service providers (1002A, 1002B, and 1002C), the cloud computing service operation 1004, the marketplace operator 1006, the network operators (1008A and 1008B), the edge operator (1010A, 1010B, 1010C, 1010D, and 1010E), and/or the customer (1012A and/or 1012B) may represent both parties (business entities) involved in the marketplace negotiations, and computing and/or networking facility operated by each party (i.e. an operator of such computing and/or networking facility). Additionally, in the same embodiment, the parties (business entities) involved in the marketplace negotiations, and computing and/or networking facility operated by each party could be of the same entity. For example, a network operator may also function as the marketplace and cloud computing service operator and application service provider. Additionally, any combination of the parties may be optional (e.g., service provider may apply to only application provider, or the cloud service provider may also be the marketplace operator, etc.). It should be noted that the customer 1012A and/or 1012B may be using one or more application software services from application service providers 1002A, 1002B, and 1002C and may be within communication range of any number of edge computing sites.

In one embodiment, a customer 1012A and/or 1012B may have any number of client devices (not shown). Additionally, the customer 1012A and/or 1012B may have client devices of several types, each using a service of a different service provider 1002A, 1002B, and 1002C. Further, the customer may have client devices operating with the same or different application software provided by various application software providers 1002A, 1002B, and 1002C. Further still, the customer 1012A and/or 1012B may have client devices, each of which may communicate with, or be serviced by, a plurality of edge computing sites.

In one embodiment, an application service provider 1002A, 1002B, and 1002C (including a software service provider) may be operating a software service. Additionally, the software service may be an application that the application service provider 1002A, 1002B, and 1002C operates on its own processing platform and provided to the customers 1012A and/or 1012B as a service in the form of Software-as-a-Service (SaaS), for example.

Further, the software service provider may operate the software service in its private processing platform (i.e., installed in the service provider premises) or in a cloud processing environment. It should be noted that the software service may have one or more edge-computing software modules that may execute in edge-computing sites near the customers' sites, for example, to reduce latency. Further, the software service may be provided to any number of customers independent of one another.

In one embodiment, different application service providers 1002A, 1002B, and 1002C may communicate with the same client devices (for different purposes). Additionally, different application service providers 1002A, 1002B, and 1002C serving the same customer 1012A and/or 1012B may use different edge sites/operators.

In one embodiment, bidders, such as network operators (real, virtual, aggregators, wholesalers, etc.) 1008A and/or 1008B may be consumers and/or customers, proposing that the customer 1012A and/or 1012B releases or surrenders a requirement for a service being provided so that the network operator 1008A and/or 1008B may be able to comply with the requirements of a different bid.

In the context of the present description, a "primary bidder" may refer to a bidder and/or proposing party receiving an original or primary service request from the end-customer, while the term "secondary bidder" may refer to a party receiving a subsequent service request from any other bidder or proposing party such as the primary bidder.

In one embodiment, a customer may issue a "bid" for a particular service, the bid describing a list of requirements. A bidder may then apply to the customer with a "counter proposal" where one or more requirements are changed. The counter proposal has the same structure as the original bid issued by the customer.

In a "regular" bidding process, the customer may issue a bid and the provider may have tools to analyze the bid and configure the service accordingly. The provider may then send a structured bidding response to the customer, and the customer may have tools to compare the responses. With the "counter proposal" the customer may operate tools to analyze bidders' counter proposals.

In various embodiments, AI managed NFV networks and cloud services may enable fast reconfiguration of the service facilities. The customers, as well as the providers, may not have to plan for the worst case scenario (maximum load or consumption). Instead, the SLA may change continuously according to local and temporal needs. For example, the service may be distributed over several providers (software service provider, cloud operator, network operator, edge computing operator, etc.), and the customer may have an SLA with only one of the providers, which may be responsible for provisioning the service via the other providers. The primary bidder may not have direct SLAs with all the other providers. For example, the customer may have an SLA with the software service provider that may have SLAs with a cloud provider and one or more network operators that may have SLAs with any number of edge computing operators.

As such, when the customer continuously (or frequently) changes the requirements of its SLA with the software service provider, all SLAs may need to accommodate automatically. Therefore, each SLA change may cause repeated bidding between all the proposing parties.

This process may involve more than the customer changing the SLA requirements. For example, changes in network configuration of a communication network may change the costing of a particular service which may enable a network operator (such as the network operators 1008A and/or 1008B) to reduce the price or may suggest relinquishing the particular business (i.e. offer to a competitor to take over the service or a particular part of it).

This process may be viewed as an inter-operator service reconfiguration through the marketplace. For example, the entire complex of customer(s), software service provider(s), cloud operator(s), network operators, edge computing operators, etc., may continuously recalculate an optimal configuration of the combined services, where the marketplace and service requests (through SLAs, costing and pricing) provide the evaluation measures.

Unlike a centralized mechanism of network configuration optimization operated by a network operator, it may be expected that the parties would not agree on a centralized inter-operator optimization service. Instead, the marketplace may be treated as a facility for each party to optimize its proposal such that one of the parties (e.g., the request originator) may select the optimized configuration without knowing the details of the considerations of the various parties.

As the marketplace is managed automatically by AI analysis systems, each party can submit to the marketplace any number of optional configurations, and the combined resources of the marketplace can evaluate a very large number of combinations (combined configurations).

Eventually, when a particular configuration is selected, an orchestration system of one party may issue instructions to an orchestration system of another party, where in one embodiment, these two orchestration systems may be connected indirectly via an intermediating party, which may require authorization and authentication per particular service, characterization, parameter, etc. Similarly, the arrangement may require a protocol supporting a complex billing chain and billing records.

Further, bidders may apply to customers. For example, a primary bidder may be regarded as a customer of a secondary bidder. It should be noted that this may differ from a counter bid to sell, even though a price cut may be involved. In other words, the bid may include a definition of the required network service (e.g., characterization, parametrization, prioritization, and/or weighting factors), which may persist as long as the compatible service is provided, and the provisioning party may re-propose according to the changing network situation.

In another embodiment, if a single bidder cannot comply with all the requirements of the service request, the automated (AI-based) system of the bidder may split the consideration system, and/or create a secondary consideration system, and communicate it to a secondary bidder.

It should be noted that the complexity, as well as the location (in network terms), of the network service may require cooperation of two or more bidders, such as network operators (real, virtual, aggregators, wholesalers, etc.). In one embodiment, at least one bidder may receive the service request for network service, determine that the service request cannot be met internally, determine that cooperation with another bidder is required, and issue a service request for a network service to the other bidder. In such situations, two or more bidders may issue different requests for network service to one another. In another embodiment, a main bidder may issue a request for network service to a third party, which may not have received the original request for network service.

Moreover, a cloud computing service operator 1004 may provide infrastructure computing services (e.g., Infrastructure-as-a-Service, or IaaS) to any number of application service providers 1002A, 1002B, and 1002C.

Furthermore, a network operator 1008A and 1008B may operate a network between any number of cloud computing sites, edge computing sites, application service providers 1002A, 1002B, and 1002C (when operating a private processing platform), and customers 1012A and/or 1012B.

In the context of the present description, a "network operating party" may include any type of business entity operating a communication network, either real or virtual, and/or providing at least one communication service. For example, the operating party may be a network operator 1008A and 1008B (real or virtual), and/or a customer 1012A and 1012B of communication services, an aggregator or wholesaler of communication infrastructure or services, or a third-party business dedicated to the operation of the network marketplace.

Additionally, an edge operator 1010A, 1010B, 1010C, 1010D, and 1010E may operate one or more edge computing sites. Additionally, the edge operator may be a dedicated edge computing operator, a telecom operator operating edge-computing sites, a virtual network operator, a virtual cloud-edge operator, or a private entity selling excessive computing power. In one embodiment, the edge computing operator may include an orchestration system to manage hardware components and software components for an edge computing site. It should be noted that the orchestration system may allocate the hardware components and the software components based on a service agreement. In one embodiment, an edge computing site may be connected to at least one communication network.

Further, a marketplace operator 1006 may communicate with the other parties and optionally with another marketplace operator. In the context of the present description, a "marketplace" may refer to any type of automatic, computer-based, and/or software-based, system that is operated by an operating party, and which may enable at least one requesting party to define a particular network service request. The marketplace may also enable at least one bidding party or service providing party (producer) to propose a network service at least partly compatible with the network service request.

In one embodiment, authentication, as well as billing chain arrangement and clearinghouse processing, may be provided by a marketplace processing service, and/or the marketplace operator 1006. In yet another embodiment, marketplace processing services may interlink to enable cooperation between parties subscribing to different marketplace services.

In another embodiment, considering that the bidding party may use an AI-based network management system, the service request and/or the consideration system may be communicated to the marketplace in the form of one or more declarative rules, and/or to the marketplace in the form of one or more artificial digital neural networks.

In the context of the present description, a "marketplace operating party" may refer to any type of business entity involved in operating at least one marketplace. Additionally, the operating party may also be a requesting party, and/or a bidding party, and/or a service providing party. In one embodiment, the marketplace can be operated by a dedicated party, In another embodiment, any party (software service provider, cloud operator, network operator, edge computing operator, etc.), may operate a marketplace and serve as the marketplace operating party. Still yet, each party may operate a part of the marketplace facility and a combination of all of the parts of the marketplace may form a virtual marketplace.

In the context of the present description, a "requesting party" may refer to any type of business entity utilizing at least one communication network and/or service (e.g., consumer, customer), and/or managing at least one communication network and/or service, etc. In the context of the present description, a "bidding party," "proposing party," and/or "service providing party" may refer to any entity operating a network facility or a computing facility, or trading in such the network facility or the computing facility, such as a wholesaler, aggregator, etc.

In one embodiment, the configuration and evaluation mechanism(s) may be negotiated in parallel to the bidding negotiation. For example, the initial service request may include a list of characteristics and their parameters, as well as prioritization and weighting factors. The service proposal may include the characteristics and their parameters as offered, and may also include network configuration data presenting design considerations, alternative configurations, as well as fallback configurations and respective pricing. The requesting party may thereafter change the evaluation mechanism (e.g., priorities and weighting factors) and send a revised service request compatible with (some of) the configuration options. These steps may be repeated to arrive at an optimal proposal.

Characterization, parametrization, prioritization, and weighting factors may be used by the requesting party, by a proposing (bidding) party, and/or by a marketplace operating party, to create a required network service, analyze a required network service and/or alternative proposed network services, and/or compare proposed network services.

In the context of the present description, a "characterization" or "characteristics" may refer to defining the types of network or communication services, facilities, and/or resources, that are required, as well as computing services, facilities, and/or resources. Additionally, in the context of the present description, a "parametrization" or "parameters" may refer to defining one or more values, or one or more ranges of values, for any characteristic of the required network or communication service, facility, and/or resource.

In the context of the present description, a "prioritization" or priority may refer to defining priorities for, or between, the various required network or communication services, facilities, resources, etc., as well as their respective parameters. Additionally, a particular characteristic may have alternative acceptable values, or value ranges, with alternative respective priorities.

In the context of the present description, a "weighting" or "weighting factor" may refer to defining and/or associating evaluation weights to characteristics and/or parameters for computing at least one value for evaluating and/or comparing a particular proposed network service with a minimum requirement and/or comparing between alternative proposals.

It should be noted that time may be defined and provided as a characteristic and/or a parameter. In one embodiment, the service may be required for a particular period of time, which may be defined as a characteristic (period), having parameters such as start time and end time. Additionally, characteristics such as bandwidth, latency, jitter, processing power, memory, and/or storage may have different values for different periods of time during the day, during the week, etc. It should be noted that a characteristic may have a parameter describing a statistical value, particularly availability and/or failure statistics. For example, bandwidth, latency, jitter, processing power, memory, storage, etc., may have a particular requirement for a certain percent of the time with allowed fall back value for another percent of the time.

Figure 11A:
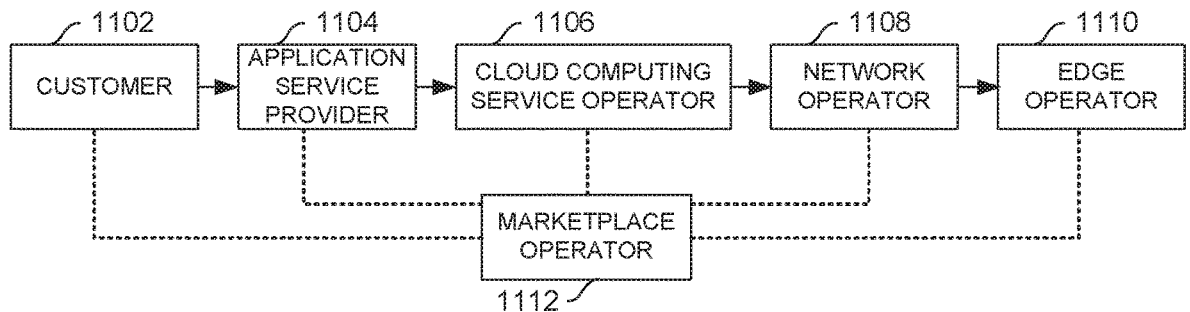
FIG. 11A illustrates a first sequence of service agreements, in accordance with one embodiment.
Figure 11B:
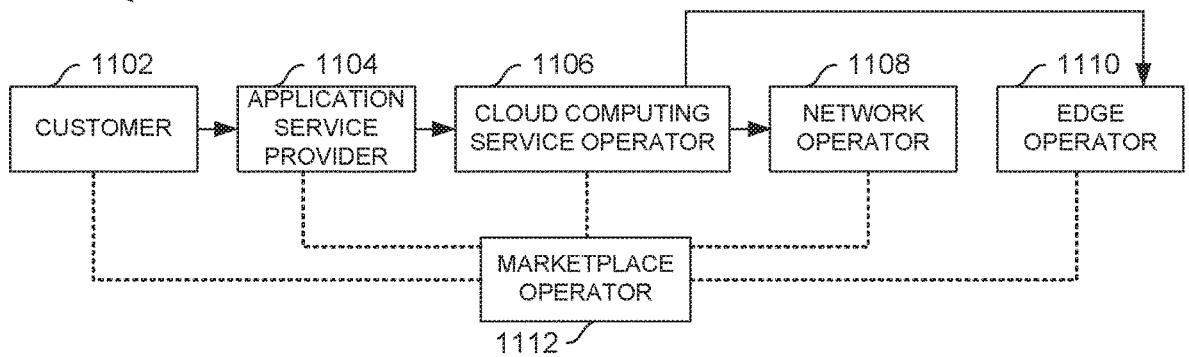
FIG. 11B illustrates a second sequence of service agreements, in accordance with one embodiment.
Figure 11C:
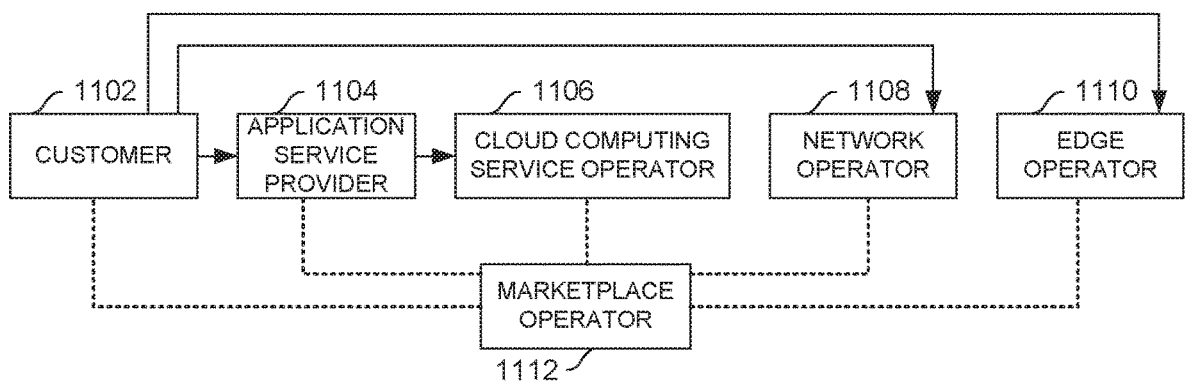
FIG. 11C illustrates a third sequence of service agreements, in accordance with one embodiment.

FIGS. 11A, 11B, and 11C illustrate a first sequence 1100, a second sequence 1101, and a third sequence 1103, respectively, of service agreements, in accordance with one embodiment. As an option, the sequences 1100, 1101, and 1103 may be implemented in the context of any one or more of the embodiments set forth in any previous and/or subsequent figure(s) and/or description thereof. Of course, however, the sequences 1100, 1101, and 1103 may be implemented in the context of any desired environment. Further, the aforementioned definitions may equally apply to the description below.

The sequences 1100, 1101, and 1103 may require several levels of protocol arrangements including authorization and authentication of the participants involved, and the exchange of requirements and configuration parameters. In one embodiment, the sequences 1100, 1101, and 1103 may include a service agreement and may include direct business relations between two parties and indirect business relations. Indirect business relations may be established using a dedicated protocol, and/or via the marketplace. It should be noted that the sequence of service agreements may be implemented in the context of the details of the previous figure and/or any subsequent figure(s), and the examples may be implemented in the context of any desired environment.

Additionally, the sequences 1100, 1101, and 1103 may be implemented in any sequence or order of service agreements between the parties. For example, the sequence 1100 may include the following order: Customer 1102>Service Provider 1104>Cloud Operator 1106>Network operator 1108>Edge Operator 1110. Additionally, for the sequence 1100, each of the customer 1102, the application service provider 1104, the cloud computing service operator 1106, the network operator 1108, and the edge operator 1110 may be connected to a marketplace operator 1112.

The sequence 1101 may include the following order: Customer 1102>Service Provider 1104>Cloud Operator 1106, and the Cloud Operator 1106 may lead to the Edge Operator 1110 and/or the Network operator 1108. Additionally, for the sequence 1101, each of the customer 1102, the application service provider 1104, the cloud computing service operator 1106, the network operator 1108, and the edge operator 1110 may be connected to a marketplace operator 1112.

The sequence 1103 may include the following order: Customer 1102>Service Provider 1104>Cloud Operator 1106, and the Customer 1102 may lead to the Network operator 1108 and/or the Edge Operator 1110. Additionally, for the sequence 1103, each of the customer 1102, the application service provider 1104, the cloud computing service operator 1106, the network operator 1108, and the edge operator 1110 may be connected to a marketplace operator 1112. Of course, any other sequence or order of service agreements may be possible.

In one embodiment, a customer 1102 using a particular software service that the customer uses in a plurality of sites may use a plurality of edge computing sites operated by different edge operators 1110, and possibly connected by different network operators 1108. Thus, there may be several different service agreement sequences operating in parallel for the same customer and software service. It should be noted that some segments of the service agreement structure may be selected based on ease of doing business (e.g., a "one stop shop"), cost optimization (i.e., cloud), and/or security considerations. Further, it should be noted that there is a plurality of competitors for each party and therefore all business structures may be viable.

In one embodiment, in any of these service agreement structures, a participant who is not in agreement with the edge operator 1110 may request an edge service (install, modify, migrate, and/or remove). As a result, therefore, a participant may be charged for an operation it did not request (or initiate).

It should be noted that neither the customer 1102 nor the application service provider 1104 may have direct business relations with the entity (the edge operator 1110) operating the edge computing site. Additionally, neither the customer 1102 nor the service provider 1104 may directly select the edge computing site if a plurality is available. Further, neither the customer 1102 nor the service provider 1104 may directly negotiate the service condition (i.e., the service level agreement) and/or configuration parameters. As a result, costing, pricing, and payment conditions may not be directly available to either the customer 1102 or the service provider 1104.

In another embodiment, a single entity may have a business relationship with all of the parties involved, but the business entity may still coordinate the configuration parameters that are required to support the service level sought.

It should be noted that each of the participants may have a different view of the particular ecosystem as each of the participants may have a plurality of alternatives to choose from. Therefore, each computational entity, including hardware and/or software, may be virtually managed by two or more management systems or orchestration systems. In one embodiment, the orchestration system of the edge computing site may manage the hardware and software computational entities within the site including a particular edge module being part of a particular software service used by a particular customer 1102. Additionally, the orchestration system of the edge computing site may determine various processing and communication parameters for the particular software module according to the requirements received, and these requirements may be changed by the orchestration system of the customer, software service provider, or another entity. In another embodiment, the orchestration system of the customer, software service provider, or another entity may decide to migrate the edge software module to another edge computing site where the particular party may have preferred arrangements considering cost, a processing parameter, and/or a communication parameter.

In one embodiment, the customer 1102 may determine a change of one or more requirements for a particular processing parameter and/or a communication parameter. As a result, the software service provider may determine that one or more parameters of the edge computing module should be changed, which may migrate the edge computing module to another edge computing site. Additionally, in one embodiment, the customers 1102 and the software service providers 1104 may avoid direct relationship with any of the old and new operators of the two edge computing sites. Further, the orchestration systems of the two edge computing sites may receive orchestration commands from an orchestration system of the customer 1102 or the service provider 1104 (or another participant) not directly connected to the orchestration systems of the two edge computing sites.

Figure 12:
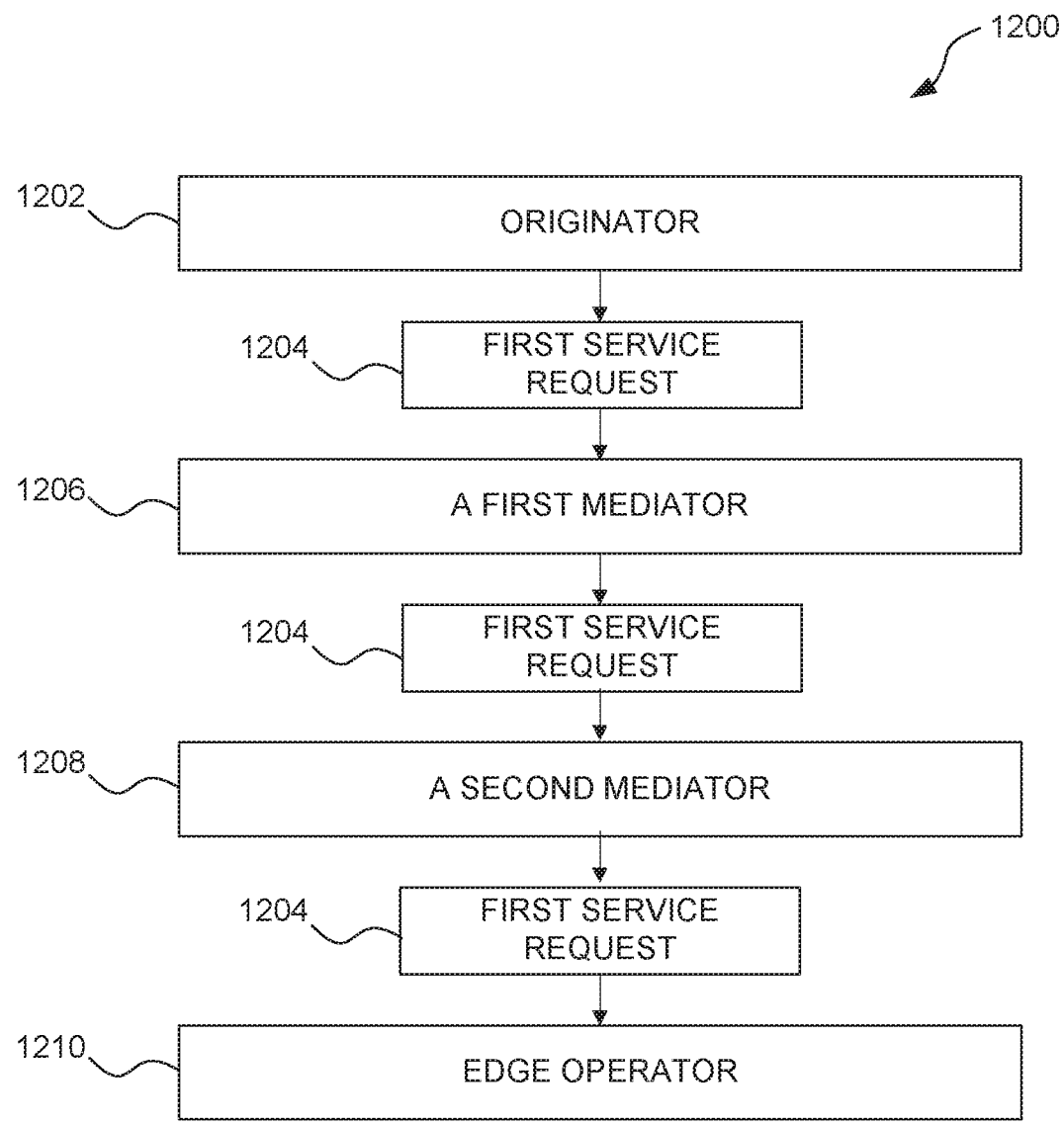
FIG. 12 illustrates a system for implementing an automatic marketplace for edge computing services, in accordance with one embodiment.

FIG. 12 illustrates a system 1200 for implementing an automatic marketplace for edge computing services, in accordance with one embodiment. As an option, the system 1200 may be implemented in the context of any one or more of the embodiments set forth in any previous and/or subsequent figure(s) and/or description thereof. Of course, however, the system 1200 may be implemented in the context of any desired environment. Further, the aforementioned definitions may equally apply to the description below.

In operation, a request originator 1202 facilitates origination of a request for an edge computing service, initiates a first service request 1204 and communicates the service request, via at least one second entity such as a first 1206 (being a request mediator), to a second mediator 1208, which in turn may provide the first service request 1204 to at least one edge computing operator 1210. Of course, it is to be understood that a service request (including but not limited to the first service request 1206) may include different requests. For example, a mediating party may not only forward a request, but may also provide some of the required service and may issue a secondary request for parts of the service it cannot directly provide. Hence the second mediator may issue a tertiary service request. Further, the chain of communication (between mediators and requests) may include any number of steps. In one embodiment, a first mediator may generate more than one request to different mediators/operators, and may generate such to receive different service(s) from each other mediator/operator, or to make a bid for the best offer, etc. In one embodiment, the first service request 1204 may include the considerations of the party requesting the service.

In one embodiment, communicating considerations may enable a bidding party to optimize the service proposal in a manner as close as possible to the procedure by which the requesting party will evaluate the proposals. An automated system of the requesting party may generate automatically, or semi-automatically, a consideration system in the form of computer data, and communicates the consideration system to an automated system of the bidding party. The automated system of the bidding party may then create a proposal (in the form of a particular service configuration as well as its pricing and other service conditions) and evaluate it according to the consideration system received from the requesting party. In such an embodiment, the automated network management system may create numerous possible service configurations, evaluate these service configurations using the consideration system of the requesting party, and select one (or more) optimized service configuration to be proposed. This process may be executed automatically and/or in real-time.

In another embodiment, the service request and/or the consideration system may be communicated to the marketplace in the form of a procedural decision tree, or configurator. In the context of the present description, a configurator may include code, or a subset of code, that enables a user to configure a product or a service by selecting functions, or features, etc. The configurator may take the user from one selection to a subsequent selection, providing, at each step, options that are only available to the current configuration (of the product or service) as selected so far. Additionally, the configurator may be sent from the customer to the provider/bidder to convey dependent priorities (such as a procedural decision tree). Unlike a plain tree, the configurator may enable the user to start the process in more than one entry point.

In still another embodiment, the party issuing a service request may have experience using this service or a similar service, and the requesting party may issue a new service request when the current service request is about to expire, there is a need to change (e.g., increase or decrease) a parameter of a particular characteristic, and/or because there is a need to add or remove a characteristic. In such a case, the issuing party may have log data reflecting the experience of the issuing party with the service being used. In another embodiment, the issuing party may then communicate the log data to the proposing party (including the party who may be responding to the service request or proposing the requested service). Thus, the proposing party may then use the log data as training data for the AI engine to analyze one or more possible configurations as well as to evaluate compliance with the service request.

In one embodiment, a proposing party may run a simulation of the requested service, generate a log data of the simulation, and communicate the log data of the simulation to the requesting party. Thereafter, the requesting party may use the log data in the simulation as a training data for its own AI engine to evaluate the proposal.

In one embodiment, the first mediator 1206 (or the requesting mediator) may communicate the received first service request 1204 from at least one request originator 1202 or another request mediator, to at least one of a second request mediator 1208, and edge computing operator 1210. In one embodiment, at least one edge computing operator receives the first service request 1204 for the edge computing service.

In one embodiment, the service request 1204 may include any of the following data: 1) authentication of the originator 1202 of the service request; 2) authentication of a billing chain; 3) authentication of a software component associated with the request originator and/or the billing chain; 4) instruction for installing a software component; 5) instruction for instantiating a software component; 6) instruction for configuring a software component; 7) instruction for aborting the execution of a software component; or 8) configuration parameters of edge computing service for the software component.

Figure 13:
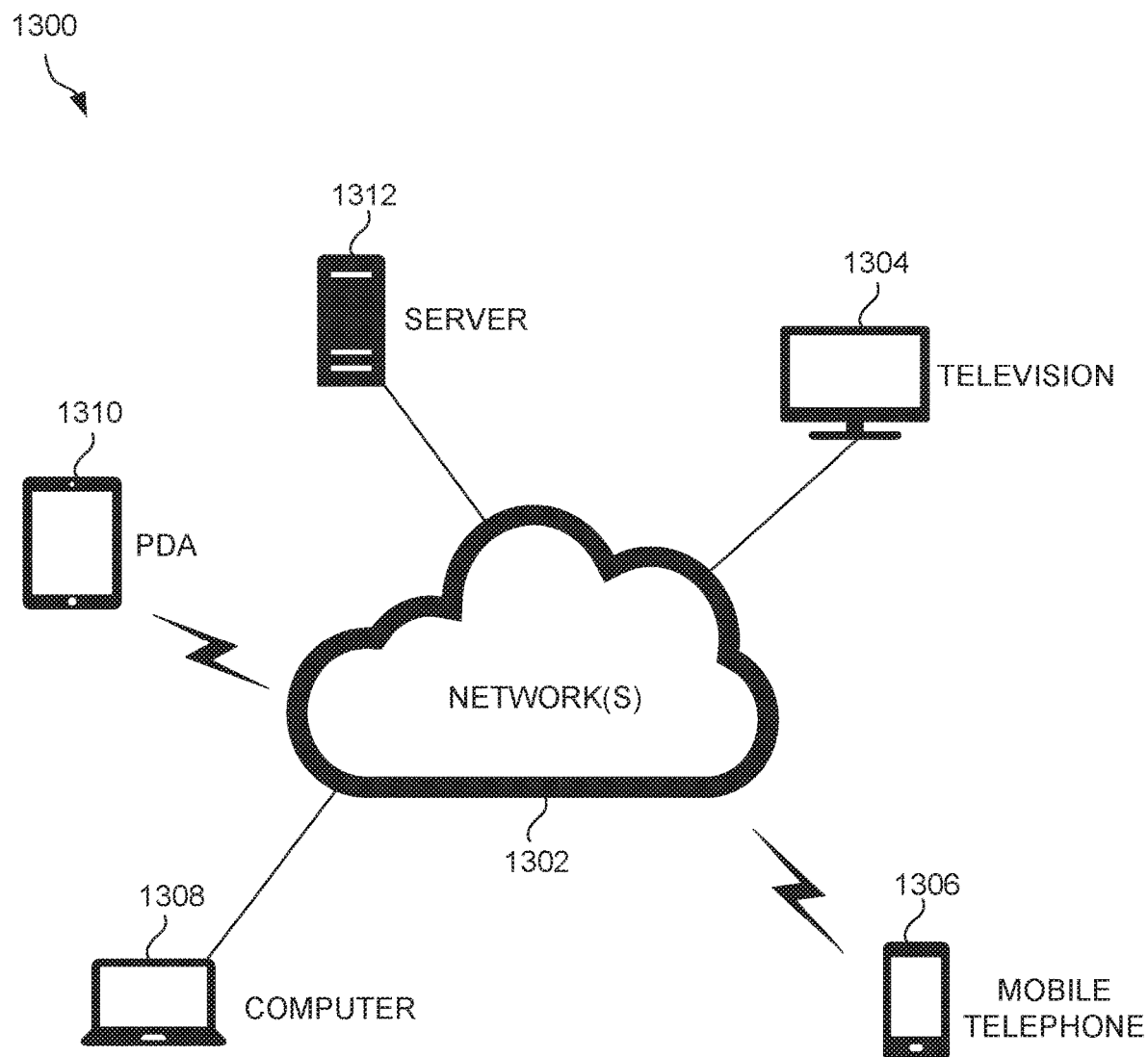
FIG. 13 illustrates a network architecture, in accordance with one possible embodiment.

FIG. 13 illustrates a network architecture 1300, in accordance with one possible embodiment. As shown, at least one network 1302 is provided. In the context of the present network architecture 1300, the network 1302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1302 may be provided.

Coupled to the network 1302 is a plurality of devices. For example, a server computer 1312 and an end user computer 1308 may be coupled to the network 1302 for communication purposes. Such end user computer 1308 may include a desktop computer, lap-top computer, and/or any other type of logic. Still yet, various other devices may be coupled to the network 1302 including a personal digital assistant (PDA) device 1310, a mobile phone device 1306, a television 1304, etc.

Figure 14:
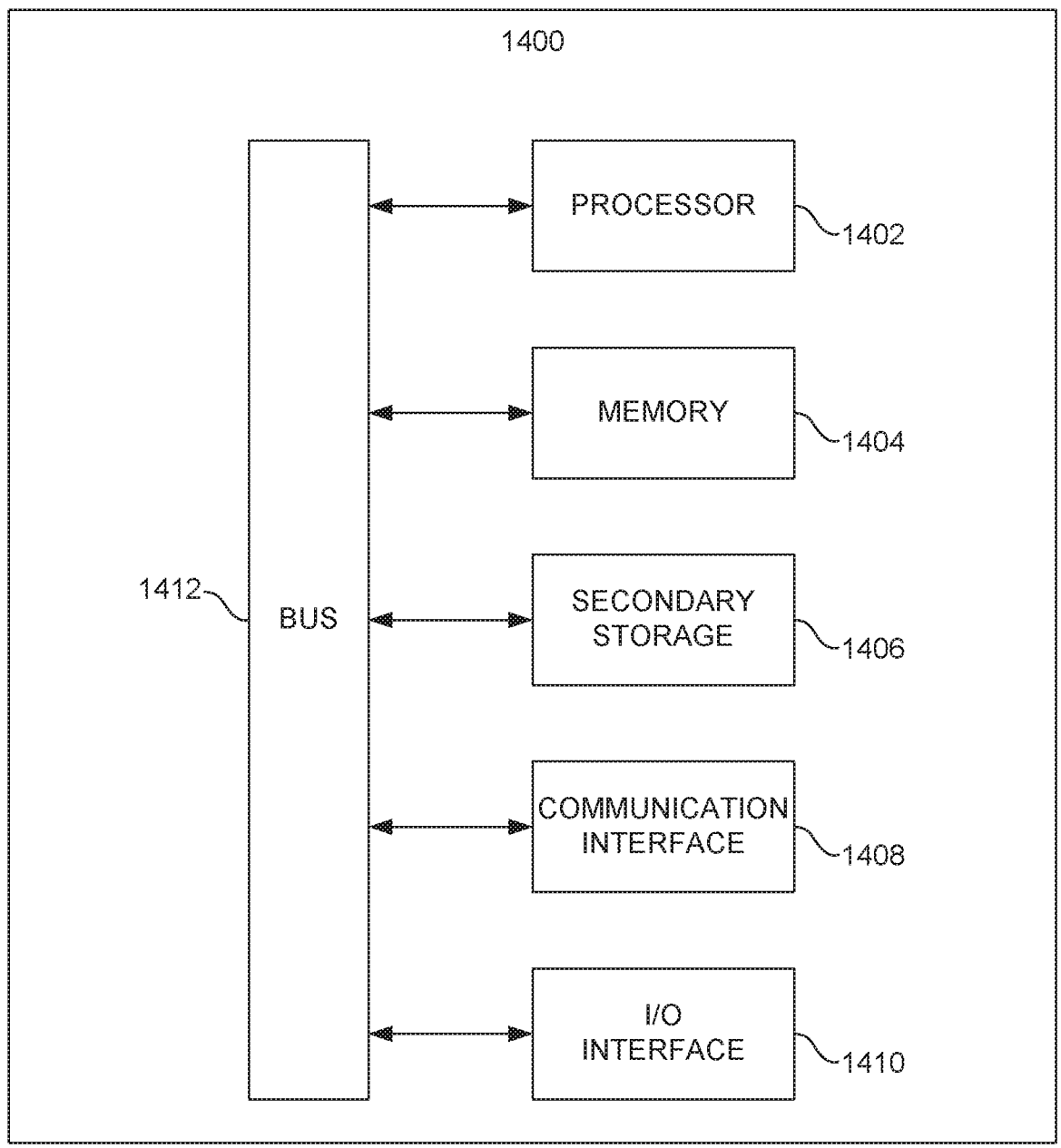
FIG. 14 illustrates an exemplary system, in accordance with one embodiment.

FIG. 14 illustrates an exemplary system 1400, in accordance with one embodiment. As an option, the system 1400 may be implemented in the context of any of the devices of the network architecture 1300 of FIG. 13. Of course, the system 1400 may be implemented in any desired environment.

As shown, a system 1400 is provided including at least one central processor 1402 which is connected to a communication bus 1412. The system 1400 also includes main memory 1404 [e.g. random access memory (RAM), etc.]. The system 1400 also includes a graphics processor 1408 and a display 1410.

The system 1400 may also include a secondary storage 1406. The secondary storage 1406 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1404, the secondary storage 1406, and/or any other memory, for that matter. Such computer programs, when executed, enable the system 1400 to perform various functions (as set forth above, for example). Memory 1404, storage 1406 and/or any other storage are possible examples of non-transitory computer-readable media. It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product comprising computer executable instructions stored on a non-transitory computer readable medium that when executed by a processor of a network communication device instruct the processor to:
   receive a service request, at a network communication operator of a communication network, from a request originator, the service request being for an edge computing service provided by an edge computing operator at an edge computing site connected to the communication network; and
   distribute, using the network communication operator, the service request to the edge computing operator;
   wherein a first service agreement exists between the network communication operator and the request originator and a second service agreement exists between the network communication operator and the edge computing operator;
   wherein the first service agreement and the second service agreement operate in parallel;
   wherein the edge computing operator includes an orchestration system that allocates hardware components and software components to the edge computing site based on a third service agreement.

2. The computer program product of claim 1, wherein the service request comprises at least one of:
   an installation of a software component;
   an instantiation of the software component;
   a configuration of the software component; or
   a configuration of the edge computing service for the software component.

3. The computer program product of claim 1, wherein the service request comprises at least one of:
   an authentication of the request originator;
   an authentication of a billing chain; or
   an authentication of a software component associated with at least one of the request originator or the billing chain.

4. The computer program product of claim 1, wherein the service request comprises at least one of a decision tree, a declarative rule, or a neural network.

5. The computer program product of claim 1, wherein the service request comprises training data associated with the service request.

6. The computer program product of claim 1, wherein the service request comprises log data of a network event, wherein the log data is used to train an artificial intelligence (AI) engine, wherein the log data includes one or more possible network configurations.

7. The computer program product of claim 6, wherein the log data is used to evaluate a compliance with the service request.

8. The computer program product of claim 1, wherein the service request is received in response to at least one of:
   an expiration of a current service request;
   a network event that prompts a change in a network parameter; or
   a need to add a new network parameter.

9. The computer program product of claim 1, wherein the service request includes log data of a network simulation by an artificial intelligence (AI) engine.

10. The computer program product of claim 1, wherein distributing the service request to the edge computing operator occurs automatically.

11. The computer program product of claim 1, wherein the service request includes a request for at least one proposed network service.

12. The computer program product of claim 11, wherein each of the at least one proposed network service includes a weighting factor.

13. A method, comprising:
   receiving, at a network communication operator of a communication network, a service request from a request originator, the service request being for an edge computing service provided by an edge computing operator at an edge computing site connected to the communication network; and
   distributing, using the network communication operator, the service request to the edge computing operator;
   wherein a first service agreement exists between the network communication operator and the request originator and a second service agreement exists between the network communication operator and the edge computing operator;
   wherein the first service agreement and the second service agreement operate in parallel;
   wherein the edge computing operator includes an orchestration system that allocates hardware components and software components to the edge computing site based on a third service agreement.

14. A device, comprising:
   a non-transitory memory storing instructions; and
   one or more processors in communication with the non-transitory memory, wherein the one or more processors execute the instructions to:
      receive a service request, at a network communication operator of a communication network, from a request originator, the service request being for an edge computing service provided by an edge computing operator at an edge computing site connected to the communication network; and distribute, using the network communication operator, the service request to the edge computing operator;

wherein a first service agreement exists between the network communication operator and the request originator and a second service agreement exists between the network communication operator and the edge computing operator;

wherein the first service agreement and the second service agreement operate in parallel;

wherein the edge computing operator includes an orchestration system that allocates hardware components and software components to the edge computing site based on a third service agreement.

15. The computer program product of claim 1, wherein the service request is distributed to the edge computing operator via a request mediator.

16. The computer program product of claim 15, wherein service request includes a plurality of different requests associated with a service, and wherein the request mediator:

provides at least one part of the service associated with at least one different request of the plurality of different requests, and issues a secondary request for remaining parts of the service associated with remaining requests of the plurality of different requests.

* * * * *